United States Patent
Venkatasanthanam et al.

(10) Patent No.: US 6,541,098 B2
(45) Date of Patent: Apr. 1, 2003

(54) THREE-DIMENSIONAL FLEXIBLE ADHESIVE FILM STRUCTURES

(75) Inventors: Sriram Venkatasanthanam, Chino Hills, CA (US); Evgueni Rozenbaoum, Arcadia, CA (US); Pradeep S. Iyer, Hacienda Heights, CA (US); Jesse C. Ercillo, Covina, CA (US); John Hughen, Upland, CA (US); Michael Hannington, Madison, OH (US); Prakash Mallya, Sierra Madre, CA (US)

(73) Assignee: Avery Dennison Corporation, Pasadena, CA (US)

( * ) Notice: Subject to any disclaimer, the term of this patent is extended or adjusted under 35 U.S.C. 154(b) by 44 days.

(21) Appl. No.: 09/747,461

(22) Filed: Dec. 22, 2000

(65) Prior Publication Data

US 2002/0119292 A1 Aug. 29, 2002

(51) Int. Cl.$^7$ .......................... B32B 3/00; B32B 15/04; B29C 47/00
(52) U.S. Cl. .................. 428/161; 428/40.1; 428/172; 428/174; 428/354; 264/176.1; 264/210.1; 156/244.15
(58) Field of Search ................ 478/137, 40.1, 478/42.1, 161, 163, 172, 174, 180, 354; 156/196, 244.11, 244.15, 201, 325; 264/176.1, 177.1, 177.17, 210.1, 211.12

(56) References Cited

U.S. PATENT DOCUMENTS

| | | | |
|---|---|---|---|
| 3,036,945 A | 5/1962 | Souza | |
| 3,113,986 A | 12/1963 | Breslow et al. | |
| 3,239,478 A | 3/1966 | Harlan, Jr. | 260/27 |
| 3,251,905 A | 5/1966 | Zelinski | 260/879 |
| 3,301,741 A | 1/1967 | Henrickson et al. | |
| 3,312,005 A | 4/1967 | McElroy | |

(List continued on next page.)

FOREIGN PATENT DOCUMENTS

| | | |
|---|---|---|
| EP | 0 037 101 | 3/1981 |
| EP | 0 623 332 A1 | 5/1994 |
| EP | 0 708 162 A2 | 4/1996 |
| EP | 02/08067 A2 | 1/2002 |
| GB | 1069445 | 5/1964 |
| JP | 07-246216 | 9/1995 |
| WO | WO 95/11945 | 5/1995 |
| WO | WO 95/31225 | 11/1995 |
| WO | WO 96/19173 | 6/1996 |
| WO | WO 96/37568 | 11/1996 |
| WO | WO 96/41604 | 12/1996 |
| WO | WO 97/10310 | 3/1997 |
| WO | WO 97/18276 | 5/1997 |
| WO | 97/25256 | 7/1997 |
| WO | WO 97/25256 | 7/1997 |
| WO | WO 97/25268 | 7/1997 |
| WO | WO 97/30844 | 8/1997 |
| WO | WO 98/13199 | 4/1998 |
| WO | WO 98/21410 | 5/1998 |
| WO | WO 98/55109 | 12/1998 |
| WO | WO 99/03596 | 1/1999 |
| WO | WO 00/61677 | 10/2000 |

OTHER PUBLICATIONS

PCT/US01/44957; International Search Report mailed Apr. 8, 2002.

Primary Examiner—Donald J. Loney
(74) Attorney, Agent, or Firm—Renner, Otto, Boisselle & Sklar, LLP

(57) ABSTRACT

Three-dimensional flexible adhesive film structures are described which exhibit tack on demand characteristics. The film is capable of showing minimal or no tack under normal handling conditions, but when pressed against a target surface, exhibits the desired adhesion.

82 Claims, 2 Drawing Sheets

U.S. PATENT DOCUMENTS

| | | | | |
|---|---|---|---|---|
| 3,314,838 | A | 4/1967 | Erwin | |
| 3,331,729 | A | 7/1967 | Danielson et al. | |
| 3,346,105 | A | 10/1967 | Nye et al. | |
| 3,390,207 | A | 6/1968 | Moss et al. | |
| 3,413,168 | A | 11/1968 | Danielson et al. | |
| 3,592,710 | A | 7/1971 | Yurgen et al. | 156/153 |
| 3,598,887 | A | 8/1971 | Darcy et al. | |
| 3,639,521 | A | 2/1972 | Hsieh | 260/880 |
| 3,853,129 | A | 12/1974 | Kozak | |
| 3,879,330 | A | 4/1975 | Lustig | |
| 3,932,328 | A | 1/1976 | Korpman | 260/27 |
| 3,943,609 | A | 3/1976 | Egan, Jr. | |
| 3,967,624 | A | 7/1976 | Milnamow | |
| 3,984,509 | A | 10/1976 | Hall et al. | 264/40.1 |
| 4,023,570 | A | 5/1977 | Chinai et al. | |
| 4,054,697 | A | 10/1977 | Reed et al. | |
| 4,061,820 | A | 12/1977 | Magid et al. | |
| 4,067,337 | A | 1/1978 | Ness | |
| 4,208,356 | A | 6/1980 | Fukawa et al. | 525/89 |
| 4,217,164 | A | 8/1980 | La Mers | 156/541 |
| 4,219,627 | A | 8/1980 | Halasa et al. | |
| 4,226,952 | A | 10/1980 | Halasa et al. | |
| 4,237,889 | A | 12/1980 | Gobran | |
| 4,303,461 | A | 12/1981 | La Mers | 156/361 |
| 4,336,804 | A | 6/1982 | Roeder | |
| 4,337,772 | A | 7/1982 | Roeder | |
| 4,376,440 | A | 3/1983 | Whitehead et al. | |
| 4,379,806 | A | 4/1983 | Korpman | 428/354 |
| 4,388,349 | A | 6/1983 | Korpman et al. | 427/208.4 |
| 4,392,897 | A | 7/1983 | Herrington | |
| 4,397,905 | A | 8/1983 | Dettmer et al. | |
| 4,410,130 | A | 10/1983 | Herrington | |
| 4,415,087 | A | 11/1983 | Clayton et al. | |
| 4,460,634 | A | 7/1984 | Hasegawa | |
| 4,519,095 | A | 5/1985 | Clayton | |
| 4,546,029 | A | 10/1985 | Cancio et al. | |
| 4,556,595 | A | 12/1985 | Ochi | |
| 4,578,429 | A | 3/1986 | Gergen et al. | |
| 4,587,152 | A | 5/1986 | Gleichenhagen et al. | |
| 4,612,221 | A | 9/1986 | Biel et al. | |
| 4,655,761 | A | 4/1987 | Grube et al. | |
| 4,657,970 | A | 4/1987 | Shiraki et al. | |
| 4,695,422 | A | 9/1987 | Curro et al. | |
| 4,713,273 | A | 12/1987 | Freedman | 428/40 |
| 4,716,052 | A | 12/1987 | Waugh et al. | 427/147 |
| 4,778,644 | A | 10/1988 | Curro et al. | |
| 4,795,782 | A | 1/1989 | Lutz et al. | |
| 4,803,032 | A | 2/1989 | Schulz | |
| 4,820,589 | A | 4/1989 | Dobreski et al. | |
| 4,839,216 | A | 6/1989 | Curro et al. | |
| 4,888,075 | A | 12/1989 | Freedman | 156/243 |
| 4,894,275 | A | 1/1990 | Pelzer | |
| 4,896,793 | A | 1/1990 | Briggs et al. | 221/73 |
| 4,946,527 | A | 8/1990 | Battrell | |
| 4,959,265 | A | 9/1990 | Wood et al. | |
| 5,008,139 | A | 4/1991 | Ochi et al. | |
| 5,047,196 | A | 9/1991 | Zuckerberg et al. | 264/171 |
| 5,080,957 | A | 1/1992 | Leseman et al. | |
| 5,089,320 | A | 2/1992 | Straus et al. | 428/216 |
| 5,112,674 | A | 5/1992 | German et al. | |
| 5,116,677 | A | 5/1992 | Jones | |
| 5,141,790 | A | 8/1992 | Calhoun et al. | |
| 5,164,444 | A | 11/1992 | Bernard | |
| 5,165,982 | A | 11/1992 | Gubitz et al. | |
| D331,665 | S | 12/1992 | Underhill | |
| 5,176,939 | A | 1/1993 | Shepherd | |
| 5,186,782 | A | 2/1993 | Freedman | 156/244.11 |
| 5,215,804 | A | 6/1993 | Hagens et al. | |
| 5,221,276 | A | 6/1993 | Battrell | |
| 5,242,650 | A | 9/1993 | Rackovan et al. | 264/509 |
| 5,246,762 | A | 9/1993 | Nakamura | |
| 5,269,776 | A | 12/1993 | Lancaster et al. | |
| 5,273,805 | A | 12/1993 | Calhoun et al. | |
| 5,275,588 | A | 1/1994 | Matsumoto et al. | |
| 5,286,781 | A | 2/1994 | Gotoh et al. | 524/505 |
| 5,290,842 | A | 3/1994 | Sasaki et al. | 524/271 |
| 5,296,277 | A | 3/1994 | Wilson et al. | |
| 5,300,347 | A | 4/1994 | Underhill et al. | |
| 5,324,279 | A | 6/1994 | Lancaster et al. | |
| 5,334,428 | A | 8/1994 | Dobreski et al. | |
| 5,342,344 | A | 8/1994 | Lancaster et al. | |
| 5,344,693 | A | 9/1994 | Sanders | |
| 5,436,057 | A | 7/1995 | Schulz | |
| 5,451,283 | A | 9/1995 | Josephy et al. | 156/229 |
| 5,453,296 | A | 9/1995 | Lauritzen et al. | |
| 5,458,938 | A | 10/1995 | Nygard et al. | |
| 5,487,929 | A | 1/1996 | Rusincovitch, Jr. et al. | |
| 5,514,122 | A | 5/1996 | Morris et al. | |
| 5,516,393 | A | 5/1996 | Freedman | 156/229 |
| 5,518,801 | A | 5/1996 | Chappell et al. | |
| D373,026 | S | 8/1996 | Delebreau et al. | |
| 5,575,747 | A | 11/1996 | Dais et al. | |
| 5,585,178 | A | 12/1996 | Calhoun et al. | |
| 5,585,193 | A | 12/1996 | Josephy et al. | |
| 5,589,122 | A | 12/1996 | Leonard et al. | 264/146 |
| 5,639,811 | A | 6/1997 | Plamthottam et al. | |
| D381,810 | S | 8/1997 | Schultz et al. | |
| 5,660,922 | A | 8/1997 | Herridge et al. | 428/214 |
| 5,662,758 | A | 9/1997 | Hamilton et al. | |
| 5,716,669 | A | 2/1998 | LaRose et al. | 427/208.4 |
| 5,865,927 | A | 2/1999 | Puletti et al. | |
| 5,871,607 | A | 2/1999 | Hamilton et al. | |
| 5,906,883 | A | 5/1999 | Blanc-Brude | 428/178 |
| 5,965,235 | A | 10/1999 | McGuire et al. | |
| 5,968,633 | A | 10/1999 | Hamilton et al. | |
| 6,194,062 | B1 | 2/2001 | Hamilton et al. | 428/343 | ent
THREE-DIMENSIONAL FLEXIBLE ADHESIVE FILM STRUCTURES

FIELD OF THE INVENTION

The present invention relates to thin three-dimensional flexible adhesive film structures that exhibit minimal or no tack under normal handling conditions, but which adhere to a wide variety of substrates when pressure is applied.

BACKGROUND OF THE INVENTION

Sheet-like materials for use in the containment and protection of various items, as well as for the preservation of perishable materials such as food items, are well known in the art. Such materials can be utilized to wrap items individually and can be utilized to form a cover or seal for a semi-enclosed container. One class of such materials in common use today comprises those of a polymeric composition formed into a thin, conformable web commonly supplied in rolled form. Common examples of such materials are polyvinyl chloride (PVC), polyvinylidene chloride (PVDC), and polyethylene (PE) sheet materials. These materials exhibit a clinging character on at least one surface due to the properties of the polymeric materials from which they are formed, and/or due to the presence of additives such as plasticizers, tackifiers, etc. When these film materials are folded or wrapped around in items, they cling either to the item or to themselves, or both. The barrier properties of many such materials, particularly their oxygen, moisture/moisture vapor, and odor barrier properties, provide the desired preservation characteristics for perishable items such as food items and/or items which oxidize or otherwise degrade more rapidly with continued exposure to environmental conditions.

While these materials have achieved a certain level of acceptance, difficulties often are encountered in locating or isolating the end portion of the material when it is supplied in the form of a continuous roll in a dispensing carton or apparatus. In addition, the tendancy of these film materials to cling to themselves also increases the dispensing force required to unroll the web, and often leads to undesirable and premature clinging of a sheet of the material to itself before it can be wrapped around an item. Also, because these materials "cling" to themselves and other surfaces, i.e., they exhibit an attraction or affinity for the material rather than form an adhesive bond, their affinity for a complementary surface is highly dependent upon material characteristics such as chemical composition, electrical conductivity, surface energy, surface finish, etc.

The problem of premature adhesion also has been recognized in the art of tapes, labels, and other articles using pressure sensitive adhesives to adhere an adhesive coated surface to a substrate. For example, before the adhesive coated surface can be properly positioned over a substrate, inadvertent contact of the adhesive with the substrate or target causes premature adhesion at one or more locations thereby inhibiting proper positioning.

Various procedures and products have been suggested in the prior art for overcoming the problem of premature adhesion of adhesive articles to substrates. U.S. Pat. No. 5,662,758 (Hamilton et al), for example, describes a method for making a flexible film having pressure sensitive adhesive protected from inadvertent adheranc e. The method coats a forming screen with an interconnected layer of pressure sensitive adhesive and places a piece of flexible film in contact with the layer of adhesive. The layer of adhesive preferentially adheres to the piece of flexible film. The forming screen has a plurality of recesses therein, and the coating step applies a layer of adhesive without bridging the recesses. Another step forms the piece of flexible film to create a plurality of protrusions extending into the recesses. Since contact of the adhesive with a target surface is prevented by the outer most ends of the protrusions, there is no adhesion between the three-dimensional sheet and the target surface until pressure is applied to the non-adhesive side of the flexible film whereby the adhesive within the recesses comes in contact with the target surface and the film adheres to the target surface.

U.S. Pat. No. 5,968,633 (Hamilton et al) describes a selectively-activatable sheet material for dispensing and dispersing a substrate onto a target surface wherein the sheet material comprises (a) a three-dimensional sheet of material having a first side and a second side, said first side having a plurality of hollow protrusions extending outwardly therefrom and separated from one another from valleys, said second side having a plurality of depressions corresponding with said plurality of hollow protrusions; and (b) a substance adhering to and partially filling a location protected from external contact comprising at least one of said valleys and said depressions, such that said sheet material may be selectively activated by deforming said hollow protrusions to deliver said substance to a target surface. The substances which may be included in the recesses of the selectively-activatable sheet include cleansing agents, medicinal agents, emollients, lubricants, adhesives, fragrances, deodorants, etc.

It has also been suggested in the prior art that the problem of premature adhesion can be overcome by providing stand-offs on a material surface between which adhesive elements are located. Standoffs include any means extending outwardly from an adhesive surface which is contacted first before the adhesive surface is exposed to contact by another surface. Protecting an adhesive from premature contact by another surface also has been achieved by adding strips of polymer foam to form deformable standoffs on an adhesive surface. Polymer foams, however, tend to spring back and exert a peel force on the adhesive bond to the target surface.

U.S. Pat. No. 5,141,790 (Calhoun et al), discloses a repositional pressure sensitive tape with an adhesive coated surface which has clumps of particles spaced out on the adhesive to keep the adhesive from touching the target surface until the sheet is pressed against the target surface. The particles are smaller than the thickness of the adhesive layer so that when pressed, the particles sink below the surface of the adhesive and no longer provide their spacing function.

U.S. Pat. No. 5,871,607 (Hamilton et al) describes a material having a substance protected by deformable standoffs, and the method of making the material. In particular, the patent describes a method for making a three-dimensional structure having outermost surface features and having spaces for containing a substance internal to said outermost surface features such that said substances protected from inadvertent contact with external surfaces. The method comprises the steps of coating a substance onto a forming surface, applying a piece of material to the substance coated forming surface, transferring said substance from said forming surface to said piece of material, and forming said piece of material into a three-dimensional structure on said forming surface while said substance is in contact with said forming surface in order to accurately register the three-dimensional structure with said substance.

International application WO 97/25256 relates to improved storage wrap materials which comprise a sheet of material having a first side and a second side. The first side comprises an active side exhibiting an adhesion peel force after activation by a user which is greater than the adhesion peel force exhibited prior to activation by a user. The storage wrap material may be activated by different approaches, but in a preferred embodiment, the active side is activatable by an externally applied force exerted upon the sheet of material. The storage wrap material is selectively activatable by a user in discrete regions to provide adhesive properties where and when desired. The use of an adhesive or adhesive-like substance on the surface of the material provides an adhesion peel force after activation which is sufficient to form a barrier seal against a target surface at least as great as those of the material and the target surface such that perishable items, such as food items, may be effectively preserved.

SUMMARY OF THE INVENTION

A three-dimensional flexible adhesive film structure is described which comprises:

(A) a flexible polymer face film having a front surface and a back surface, said front surface comprising at least one area having one or more, three-dimensional hollow protrusions extending outwardly from said front surface, the back surface of the face film comprising at least one area having one or more three-dimensional spaced depressions corresponding to said one or more hollow protrusions on the front surface of the face film, (B) an adhesive layer having a front surface and a back surface wherein the front surface of the adhesive layer is in contact with and adhered to the back surface of the flexible polymer face film, and (C) a patterned layer of a non-adhesive material having a front surface and a back surface and containing one or more areas free of non-adhesive material wherein the front surface of the layer of non-adhesive material is in contact with and adhered to the back surface of the adhesive layer, and the area or areas free of non-adhesive material are within the three-dimensional depression or depressions in the back surface of the face film.

The flexible adhesive film structures of the invention exhibit tack on demand characteristics. Thus, the film is capable of showing minimal or no tack under normal handling conditions, but when pressed against a target surface, exhibits the desired adhesion. When the film is removed from the target surface, little or no adhesive is left on the substrate leaving a clean surface.

DETAILED DESCRIPTION OF THE INVENTION

Figure 1:
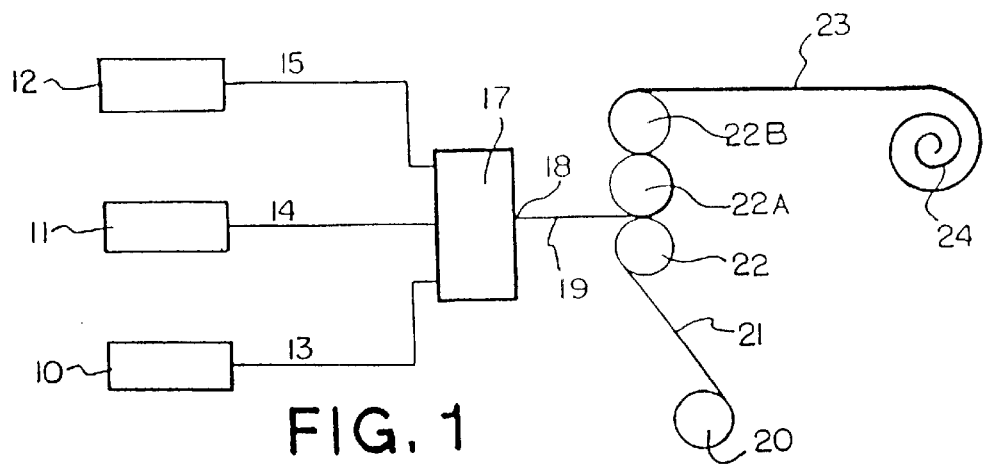
FIG. 1 is schematic side elevation of a method of making a coextruded face film/adhesive composite construction useful in the invention.

The present invention is directed to thin three-dimensional flexible adhesive film structures which, in one embodiment, comprises:

(A) a flexible polymer face film having a front surface and a back surface, (B) an adhesive layer having a front surface and a back surface wherein the front surface of the adhesive layer is in contact with and adhered to the back surface of the flexible polymer face film, and (C) a patterned layer of a non-adhesive material having a front surface and a back surface and containing one or more areas free of non-adhesive material wherein the front surface of the layer of non-adhesive material is in contact with and adhered to the back surface of the adhesive layer, and wherein the structure comprises at least one area having one or more, three-dimensional hollow protrusions extending outwardly from the front surface of the face film, and at least one area having one or more three-dimensional depressions extending inwardly from the back surface of the adhesive layer, said depressions corresponding to said one or more hollow protrusions on the front surface of the face film, and the area or areas in the non-adhesive layer which are free of non-adhesive material are within the three-dimensional depression or depressions in the back surface of the adhesive layer.

In another embodiment, the three-dimensional flexible adhesive film structure of the invention comprise:

(A) a flexible polymer face film having a front surface and a back surface, (B) an adhesive layer having a front surface and a back surface wherein the front surface of the adhesive layer is in contact with and adhered to the back surface of the flexible polymer face film, and (C) a patterned layer of a non-adhesive material having a front surface and a back surface and containing one or more areas free of non-adhesive material wherein the front surface of the layer of non-adhesive material is in contact with and adhered to the back surface of the adhesive layer, and wherein the structure comprises at least one area having a plurality of spaced three-dimensional hollow protrusions extending outwardly from the front surface of the face film, and at least one area having a plurality of spaced three-dimensional depressions extending inwardly from the back surface of the adhesive layer, said depressions corresponding to said plurality of spaced hollow protrusions on the front surface of the face film, and the areas in the non-adhesive layer which are free of non-adhesive material are within the three-dimensional depressions in the back surface of the adhesive layer.

In yet another embodiment, the three-dimensional flexible adhesive film structure of the invention comprises:

(A) a flexible polymer face film having a front surface and a back surface, (B) an adhesive layer having a front surface and a back surface wherein the front surface of the adhesive layer is in contact with and adhered to the back surface of the flexible polymer face film, and (C) a patterned layer of a non-adhesive material having a front surface and a back surface wherein the front surface of the layer of non-adhesive material is in contact with and adhered to the back surface of a portion of the adhesive layer, and wherein the structure comprises at least one area having a plurality of spaced three-dimensional hollow protrusions extending outwardly from the front surface of the face film and separated from each other by valleys, and at least one area having a plurality of spaced three-dimensional depressions extending inwardly from the back surface of the adhesive layer, said depressions corresponding to said plurality of spaced hollow protrusions on the front surface of the face film, and the front surface of the non-adhesive layer in contact with a portion of the back surface of the adhesive layer is in contact with and adhered to at least the portion of the adhesive adhered to the back surface of the face film in the valleys, provided that at least a portion of the back surface of the adhesive layer within the depressions is free of the non-adhesive material.

In still another embodiment, the three-dimensional flexible adhesive film structure of the invention comprises:

(A) a coextrudate comprising:
  (A-1) a flexible polymer face film having a front surface and a back surface, and
  (A-2) an adhesive layer having a front surface and a back surface wherein the front surface of the adhesive layer is in contact with and adhered to the back surface of the flexible polymer face film, (B) a patterned layer of a non-adhesive material having a front surface and a back surface and containing a plurality of areas which are free of non-adhesive material, wherein the structure comprises at least one area having a plurality of spaced three-dimensional hollow protrusions extending outwardly from the front surface of the face film and separated from each other by valleys, and at least one area having a plurality of spaced three-dimensional depressions extending inwardly from the back surface of the adhesive layer, said depressions corresponding to said plurality of hollow protrusions, and the front surface of the patterned non-adhesive material is in contact with and adhered to at least the back surface of the portion of the adhesive layer which is adhered to the back surfaces of the face film in the valleys, and the areas in the non-adhesive layer which are free of non-adhesive material are within the depressions.

The three-dimensional adhesive film structures of the invention exhibit little or no tack under normal handling conditions, but when pressed against a target surface, the structures exhibit the desired adhesion to the target. Accordingly, the adhesive film structures are useful in a variety of applications where "tack on demand" is desired. Pressing on the film collapses the protrusions locally to enable the exposed adhesive within the depressions to contact and stick to a target surface. In one embodiment, the adhesive has limited aggressiveness so the film may be peeled away from the target surface if and when desired, and the adhesive remains within the depressions in the film. It is also possible to stick the adhesive film of the invention to itself to form a seal, and the seal can be subsequently peeled apart. When it is desired to form a tight seal, the portion of the adhesive layer which is not covered with the patterned non-adhesive forms a continuous or torturous channel to ensure a tight seal.

Articles (food, boats, cars, etc.) can be wrapped with the three-dimensional flexible adhesive films of the invention. The films also can be used as for tapes or labels, which do not stick to each other or to a substrate until pressed. The three-dimensional flexible adhesive film structures of the invention can be stacked or wound onto rolls for storage and/or convenient packaging without fear of premature sticking, and release liners are not necessary. Some additional examples of the utility of the three-dimensional flexible adhesive film structures of the invention include: surgical drapes; dust mops; resealable bags that need closure (e.g., food bags): dust mops where the film structure is used to pick up dust etc. from a surface on demand under pressure; floor mats to pick up dust and dirt from, for example shoes; etc.

The three-dimensional flexible adhesive film structures of the present invention are prepared by first preparing a composite which comprises a flexible polymer face film having a front surface and a back surface, and an adhesive layer having a front surface and a back surface wherein the front surface of the adhesive layer is in contact with and adhered to the back surface of the flexible polymer face film. Such film structures are sometimes referred to herein as "adhesive composites". The adhesive composites can be prepared by techniques well known to those skilled in the art. For example, an adhesive layer can be deposited on a preformed polymer face film by techniques known in the art. Alternatively, a polymer face film can be laminated to a release liner having an adhesive layer on the release surface, and the release liner subsequently can be removed leaving the adhesive layer adhered to the polymer face film.

In another embodiment, an adhesive composite structure comprising a polymer face film and an adhesive layer can be prepared by coextrusion. Thus, the adhesive composite may comprise a coextrudate which comprises a continuous polymeric film having an upper surface and a lower surface, and an adhesive layer having an upper surface and a lower surface wherein the upper surface of the adhesive layer is adhesively joined to the lower surface of the polymer film.

The adhesive composites used in the present invention, and particularly the coextruded composites, generally comprise (A) a thin continuous layer of a polymer face film of from about 0.1 mil up to about 1 or 2 mils, and (B) an adhesive layer which is adhesively joined to the lower surface of the polymer face film. A significant advantage of such coextrudates, is that there is provided a technique for forming very thin construction of a low caliper film laminated to a hot melt PSA. Such thin film PSA label constructions are not generally available using conventional manufacturing processes because of the difficulty in handling such thin polymer films which may be as thin as from 0.2 to about 0.5 or 0.6 mil. In one embodiment, the thin continuous layer of polymer film (A) may comprise more than one film layer. Thus, the film (A) may be a multilayer polymeric film containing from 2 up to 9 or 10 thin polymer layers or even up to 500 or 1000 polymer film layers.

In one embodiment, the polymer film of the adhesive composites can be obtained from any polymeric material that is capable of being coextruded with a variety of adhesives, and more particularly, as described below, with pressure sensitive adhesives. For example, it may be desired that the polymeric film material have a solubility parameter that is inconsistent with or incompatible with that of the adhesive to prevent migration between the two layers when coextruded.

The polymer film materials useful in the adhesive composites include polystyrenes, polyolefins, polyamides, polyesters, polycarbonates, polyvinyl alcohol, poly(ethylene vinyl alcohol), polyurethanes, polyacrylates including copolymers of olefins such as ethylene and propylene with acrylic acids and esters, copolymers of olefins and vinyl acetate, ionomers and mixtures thereof. In one preferred embodiment, the polymer film material is a polyolefin. The polyolefin film materials generally are characterized as having a melt index or melt flow rate of less than 30, more often less than 20, and most often less than 10 as determined by ASTM Test Method 1238.

The polyolefins which can be utilized as the polymer face film material include polymers and copolymers of ethylene, propylene, 1-butene, etc., or blends of mixtures of such polymers and copolymers. Preferably, the polyolefins comprise polymers and copolymers of ethylene and propylene. In another preferred embodiment, the polyolefins comprise propylene homopolymers, and copolymers such as propylene-ethylene and propylene-1-butene copolymers. Blends of polypropylene and polyethylene with each other, or blends of either or both of them with polypropylene-polyethylene copolymer also are useful. In another embodiment, the polyolefin film materials are those with a very high propylenic content, either polypropylene homopolymer or propylene-ethylene copolymers or blends of polypropylene and polyethylene with low ethylene content, or propylene-1-butene copolymers or blend of polypropylene and poly-1-butene with low butene content.

Various polyethylenes can be utilized as the polymer film material including low, medium, and high density polyethylenes, and mixtures thereof. An example of a useful low density polyethylene (LDPE) is Rexene 1017 available from Huntsman. An example of a useful high density polyethylene (HDPE) is Formoline LH5206 available from Formosa Plastics. In one embodiment the polymer film material comprises a blend of 80 to 90% HDPE and 10–20% of LDPE.

The propylene homopolymers which can be utilized as the polymer film material in the adhesive composites useful in the invention, either alone, or in combination with a propylene copolymer as described herein, include a variety of propylene homopolymers such as those having melt flow rates (MFR) from about 0.5 to about 20 as determined by ASTM Test D 1238. In one embodiment, propylene homopolymers having MFR's of less than 10, and more often from about 4 to about 10 are particularly useful. Useful propylene homopolymers also may be characterized as having densities in the range of from about 0.88 to about 0.92 g/cm³. A number of useful propylene homopolymers are available commercially from a variety of sources, and some useful polymers include: 5A97, available from Union Carbide and having a melt flow of 12.0 g/10 min and a density of 0.90 g/cm³; DX5E66, also available from Union Carbide and having an MFI of 8.8 g/10 min and a density of 0.90 g/cm³; and WRD5-1057 from Union Carbide having an MFI of 3.9 g/10 min and a density of 0.90 g/cm³. Useful commercial propylene homopolymers are also available from Fina and Montel.

Examples of useful polyamide resins include resins available from EMS American Grilon Inc., Sumter, S.C. under the general tradename Grivory such as CF6S, CR-9, XE3303 and G-21. Grivory G-21 is an amorphous nylon copolymer having a glass transition temperature of 125° C., a melt flow index (DIN 53735) of 90 ml/10 min and an elongation at break (ASTM D638) of 15. Grivory CF65 is a nylon 6/12 film grade resin having a melting point of 135° C., a melt flow index of 50 ml/10 min, and an elongation at break in excess of 350%. Grilon CR9 is another nylon 6/12 film grade resin having a melting point of 200° C., a melt flow index of 200 ml/10 min, and an elongation at break at 250%. Grilon XE 3303 is a nylon 6.6/6.10 film grade resin having a melting point of 200° C., a melt flow index of 60 ml/10 min, and an elongation at break of 100%. Other useful polyamide resins include those commercially available from, for example, Union Camp of Wayne, New Jersey under the Uni-Rez product line, and dimer-based polyamide resins available from Bostik, Emery, Fuller, Henkel (under the Versamid product line). Other suitable polyamides include those produced by condensing dimerized vegetable acids with hexamethylene diamine. Examples of polyamides available from Union Camp include Uni-Rez 2665; Uni-Rez 2620; Uni-Rez 2623; and Uni-Rez 2695. Some of the physical properties of polymer films formed from the Uni-Rez polyamides are summarized in the following Table I.

TABLE I

| Uni-Rez Product | Softening Point (° C.) | Brookfield Viscosity (cPs at 190° C.) | Tensile Strength (PSI) | Percent Ultimate Elongation |
|---|---|---|---|---|
| 2620 | 105 | 900 | 1000 | 50 |
| 2623 | 106 | 6500 | 1000 | 400 |
| 2665 | 165 | 11,000 | 2000 | 500 |
| 2695 | 128 | 5000 | 200 | 175 |
| 2620/2623 (blend at 1:3) | 128 | 5100 | 1000 | 313 |

Polystyrenes can also be utilized as the polymer face film material in the adhesive! composites and these include homopolymers as well as copolymers of styrene and substituted styrene such as alpha-methyl styrene. Examples of styrene copolymers and terpolymers include: acrylonitrile-butene-styrene (ABS); styrene-acrylonitrile copolymers (SAN); styrene butadiene (SB); styrene-maleic anhydride (SMA); and styrene-methyl methacrylate (SMMA); etc. An example of a useful styrene copolymer is KR-10 from Phillips Petroleum Co. KR-10 is believed to be a copolymer of styrene with 1,3-butadiene.

Polyurethanes also can be utilized as the polymer film material in the composite constructions, and the polyurethanes may include aliphatic as well as aromatic polyurethanes.

Polyesters prepared from various glycols or polyols and one or more aliphatic or aromatic carboxylic acids also are useful film materials. Polyethylene terephthalate (PET) and PETG (PET modified with cyclohexanedimethanol) are useful film forming materials which are available from a variety of commercial sources including Eastman. For example, Kodar 6763 is a PETG available from Eastman Chemical. Another useful polyester from duPont is Selar PT-8307 which is polyethylene terephthalate.

The face layer or layers may comprise a major amount of a thermoplastic copolymer or terpolymer derived from ethylene or propylene (preferably ethylene) and a functional monomer selected from the group consisting of alkyl acrylate, acrylic acid, alkyl acrylic acid, vinyl acetate and combinations of two or more thereof. In one embodiment, the functional monomer is selected from the group consisting of alkyl acrylate, acrylic acid, alkyl acrylic acid, and combinations of two or more thereof. The alkyl groups in the alkyl acrylates and the alkyl acrylic acids typically contain 1 to about 8 carbon atoms, and in one embodiment 1 to about 2 carbon atoms. The copolymer or terpolymer generally has a melting point in the range of about 50° C. to about 120° C., and in one embodiment about 60° C. to about 110° C. The functional monomer(s) component of the copolymer or terpolymer ranges from about 1 to about 15 mole percent, and in one embodiment about 1 to about 10 mole percent of the copolymer or terpolymer molecule. Examples include: ethylene/vinyl acetate copolymers; ethylene/methyl acrylate copolymers; ethylene/ethylacrylate copolymers; ethylene/butyl acrylate copolymers; ethylene/methacrylic acid copolymers; ethylene/acrylic acid copolymers; ethylene/methacrylic acid copolymers containing sodium or zinc (also referred to as ionomers); acid-, anhydride- or acrylate-modified ethylene/vinyl acetate copolymers; acid- or anhydride-modified ethylene/acrylate copolymers; anhydride-modified low density polyethylenes; anhydride-modified linear low density polyethylene, and mixtures of two or more thereof. In one embodiment, ethylene/vinyl acetate copolymers that are particularly useful include those with a vinyl acetate content of at least about 20% by weight, and in one embodiment about 20% to about 40% by weight, and in one embodiment about 22% to about 28% by weight, and in one embodiment about 25% by weight.

Examples of commercially available copolymers and terpolymers that can be used include the ethylene/vinyl acetate copolymers available from DuPont under the tradename Elvax. These include Elvax 3120, which has a vinyl acetate content of 7.5% by weight and a melting point of 99° C., Elvax 3124, which has a vinyl acetate content of 9% by weight and a melting point of 77° C., Elvax 3150, which has a vinyl acetate content of 15% by weight and a melting point of 92° C., Elvax 3174, which has a vinyl acetate content of 18% by weight and a melting point of 86° C., Elvax 3177, which has a vinyl acetate content of 20% by weight and a melting point of 85° C., Elvax 3190, which has a vinyl acetate content of 25% by weight and melting point of 77 C., Elvax 3175, which has a vinyl acetate content of 28% by weight and a melting point of 73° C., Elvax 3180, which has a vinyl acetate content of 28% by weight and a melting point of 70° C., Elvax 3182, which has a vinyl acetate content of 28% by weight and a melting point of 73° C., and Elvax 3185, which has a vinyl acetate content of 33% by weight and a melting point of 61° C., and Elvax 3190 LG, which has a vinyl acetate content of 25% by weight, a melting point of about 77° C. and a glass transition temperature ($T_g$) of about −38.6° C. Ethylene acid copolymers available from DuPont under the tradename Nucrel can also be used. These include Nucrel 0407, which has a methacrylic acid content of 4% by weight and a melting point of 109° C., and Nucrel 0910, which has a methacrylic acid content of 8.7% by weight and a melting point of 100° C. The ethylene/acrylic acid copolymers available from Dow Chemical under the tradename Primacor are also useful. These include Primacor 1430, which has an acrylic acid monomer content of 9.5% by weight, a melting point of about 97° C. and a $T_g$ of about −7.7° C. The ethylene/methyl acrylate copolymers available from Chevron under the tradename EMAC can be used. These include EMAC 2205, which has a methyl acrylate content of 20% by weight and a melting point of 83° C., and EMAC 2268, which has a methyl acrylate content of 24% by weight, a melting point of about 74° C. and a $T_g$ of about −40.6° C.

Ionomers (polyolefins containing ionic bonding of molecular chains) also are useful. Ionomer resins available from DuPont under the tradename Surlyn can also be used. These are identified as being derived from sodium, lithium or zinc and copolymers of ethylene and methacrylic acid. These include Surlyn 1601, which is a sodium containing ionomer having a melting point of 98° C., Surlyn 1605, which is a sodium containing ionomer having a melting point of about 90° C. and a $T_g$ of about −20.6° C., Surlyn 1650, which is a zinc containing ionomer having a melting point of 97° C., Surlyn 1652 which is a zinc containing ionomer having a melting point of 100° C., Surlyn 1702, which is a zinc containing ionomer having a melting point of 93° C., Surlyn 1765-1, which is a zinc containing ionomer having a melting point of 95° C., Surlyn 1707, which is a sodium containing ionomer having a melting point of 92° C., Surlyn 1802, which is a sodium containing ionomer having a melting point of 99° C., Surlyn 1855, which is a zinc containing ionomer having a melting point of 88° C., Surlyn 1857, which is a zinc containing ionomer having a melting point of 87° C., and Surlyn 1901, which is a sodium containing ionomer having a melting point of 95° C.

Polycarbonates also are useful, and these are available from the Dow Chemical Co. (Calibre) G.E. Plastics (Lexan) and Bayer (Makrolon). Most commercial polycarbonates are obtained by the reaction of bisphenol A and carbonyl chloride in an interfacial process. Molecular weights of the typical commercial polycarbonates vary from about 22,000 to about 35,000, and the melt flow rates generally are in the range of from 4 to 22 g/10 min.

The polymer film material may contain inorganic fillers and other organic or inorganic additives to provide desired properties such as appearance properties (opaque or colored films), durability and processing characteristics. Nucleating agents can be added to increase crystallinity and thereby increase stiffness. Examples of useful materials include calcium carbonate, titanium dioxide, metal particles, fibers, flame retardants, antioxidant compounds, heat stabilizers, light stabilizers, ultraviolet light stabilizers, antiblocking agents, processing aids, acid acceptors, etc.

Various nucleating agents and pigments can be incorporated into the films of the present invention. The amount of nucleating agent added should be an amount sufficient to provide the desired modification of the crystal structure while not having an adverse effect on the desired properties of the films. It is generally desired to utilize a nucleating agent to modify the crystal structure and provide a large number of considerably smaller crystals or spherulites to improve the transparency (clarity), and stiffness, and the die-cuttability of the film. Obviously, the amount of nucleating agent added to the film formulation should not have a deleterious affect on the clarity of the film. Nucleating agents which have been used heretofore for polymer films include mineral nucleating agents and organic nucleating agents. Examples of mineral nucleating agents include carbon black, silica, kaolin and talc. Among the organic nucleating agents which have been suggested as useful in polyolefin films include salts of aliphatic mono-basic or di-basic acids or aryalkyl acids such as sodium succinate, sodium glutarate, sodium caproate, sodium 4-methylvalerate, aluminum phenyl acetate, and sodium cinnamate. Alkali metal and aluminum salts of aromatic and alicyclic carboxylic acids such as aluminum benzoate, sodium or potassium benzoate, sodium betanaphtholate, lithium benzoate and aluminum tertiary-butyl benzoate also are useful organic nucleating agents. Substituted sorbitol derivatives such as bis (benzylidene) and bis (alkylbenzilidine) sorbitols wherein the alkyl groups contain from about 2 to about 18 carbon atoms are useful nucleating agents. More particularly, sorbitol derivatives such as 1,3,2,4-dibenzylidene sorbitol, 1,3,2,4-di-para-methylbenzylidene sorbitol, and 1,3,2,4-di-para-methylbenzylidene sorbitol are effective nucleating agents for polypropylenes. Useful nucleating agents are commercially available from a number of sources. Millad 8C-41-10, (a concentrate of 10% Millad 3988 and 90% polypropylene), Millad 3988 and Millad 3905 are sorbitol nucleating agents available from Milliken Chemical Co.

The amounts of nucleating agent incorporated into the film formulations of the present invention generally range from about 100 to about 6000 ppm of the film. In another embodiment, the amount of nucleating agent is in the range of about 1000 to about 5000 ppm, more preferably of about 1500 to 3500 ppm, more preferably about 2000 to 2500 ppm.

The polymer film material is chosen to provide a continuous polymer face film in the coextrudate and the film structure of this invention with one or more of the desired properties such as improved tensile strength, elongation, impact strength, tear resistance, optics (haze and gloss) and in some embodiments, printability. It is particularly desirable that the film has sufficient stiffness and flexural modulus to provide adequate protrusion stiffness upon embossing.

In one embodiment, it is desirable that the front surface of the face film can be printed or adapted to be printed with inks using printing techniques such as flexographic printing, screen printing, offset lithography, letter press, thermal transfer, etc., and that the applied ink has acceptable adhesion to the surface of the face film. The front surface of the face film can be printed before or after the multilayer film is embossed.

The choice of polymeric film forming material also is determined by its physical properties such as melt viscosity, tensile strength, percent elongation etc. As will be discussed in more detail below, coextrusion of the polymeric film material and the adhesive to form the coextrudate is facilitated when the melt viscosities of the two materials, i.e., the polymeric film material of the first layer and the adhesive material, are similar. Thus, the choice of polymeric film material to be utilized in the formation of the coextruded adhesive constructions of the present invention may be dependent upon the melt viscosity of the adhesive being coextruded with the polymeric film forming material. In one embodiment, the polymeric film material of the first layer has a hot melt viscosity that is within a factor of from about 0.07 to about 20 or even up to about 50 times, more often greater than 1 to about 20 times, [and preferably from 1 up to about 15 times] the hot melt viscosity of the adhesive at the shear rates incurred during the coextrusion process. In other embodiments, the factor is from about 1 to 15 times the hot melt viscosity of the adhesive at the shear rates. Generally the shear rates range from about 10 sec$^{-1}$ to about 10,000 sec$^{-1}$.

The thickness of the polymer film material is from about 0.1 to about 2.0 or even 4 or 5 mils. In one embodiment the thickness of the film is from about 0.2 to about 1 mil. In one embodiment, a thickness of about 0.5 mils is useful. The continuous polymeric film may comprise a single layer, or the film can be a multilayer film of two or more adjacent coextruded layers. For example the film can comprise one layer of a polyolefin and one layer of a blend of a polyolefin and a copolymer of ethylene and vinyl acetate (EVA). In another embodiment the film comprises three layers, a base or core layer of, for example, a polyolefin, and skin layers in both sides of the base or core layer which may be comprised of the same or different polymer blends. The individual layers of a multilayer film may be selected to provide desirable properties such as anti-fogging, moisture or vapor barrier, printability, improved adhesion to the adhesive layer, etc.

As noted above, the adhesive composites used in the present invention include an adhesive layer (hereinafter sometimes referred to as "substrate adhesive") having an upper surface and a lower surface wherein the upper surface of the adhesive layer is adhesively joined to the lower surface of the polymer face film. The adhesive may be a heat-activated adhesive, a hot melt adhesive, or a pressure sensitive adhesive (PSA). Adhesives which are tacky at any temperature up to about 160° C. (about 320° F.) are particularly useful. PSAs which are tacky at ambient temperatures are particularly useful in the coextruded adhesive constructions of the present invention. A variety of conventional PSAs can be utilized provided that the viscosity is or can be modified to be similar to the viscosity of the polymeric film material which is being coextruded with the adhesive. Useful PSA compositions are fluid or pumpable at the temperatures used in the melt processing. Also, the adhesive compositions should not significantly degrade or gel at the temperature employed and over the time required for melt processing and extrusion. Typically, the adhesive compositions have a viscosity of from 1000 poise to 1,000,000 poise at the processing temperature.

The adhesives may generally be classified into the following categories:

Random copolymer adhesives such as those based upon acrylate and/or methacrylate copolymers, α-olefin copolymers, silicone copolymers, chloroprene/acrylonitrile copolymers, and the like.

Block copolymer adhesives including those based upon linear block copolymers (i.e., A-B and A-B-A type), branched block copolymers, star block copolymers, grafted or radial block copolymers, and the like, and Natural and synthetic rubber adhesives. A description of useful pressure-sensitive adhesives may be found in *Encyclopedia of Polymer Science and Engineering*, Vol. 13. Wiley-Interscience Publishers (New York, 1988). Additional description of useful pressure-sensitive adhesives may be found in *Encyclopedia of Polymer Science and Technology*, Vol. 1, Interscience Publishers (New York, 1964).

Commercially available pressure-sensitive adhesives are useful in the invention. Examples of these adhesives include the hot melt pressure-sensitive adhesives available from H.B. Fuller Company, St. Paul, Minn. as HM-1597, HL-2207-X, HL-2115-X, HL-2193-X. Other useful commercially available pressure-sensitive adhesives include those available from Century Adhesives Corporation, Columbus, Ohio.

Conventional PSAs, including silicone-based PSAs, rubber-based PSAs, and acrylic-based PSAs are useful. Another commercial example of a hot melt adhesive is H2187-01, sold by Ato Findley, Inc., of Wauwatusa, Wis. In addition, rubber based block copolymer PSAs described in U.S. Pat. No. 3,239,478 (Harlan) also can be utilized in the coextruded adhesive constructions of the present invention, and this patent is hereby incorporated by a reference for its disclosure of such hot melt adhesives.

In one embodiment, the pressure sensitive adhesive utilized in the present invention comprise rubber based elastomer materials such as linear, branched, graft or radial block copolymers represented by the diblock structures A-B, the triblock A-B-A, the radial or coupled structures (A-B)$_n$, and combinations of these where A represents a hard thermoplastic phase or block which is non-rubbery or glassy or crystalline at room temperature but fluid at higher temperatures, and B represents a soft block which is rubbery or elastomeric at service or room temperature. These thermoplastic elastomers may comprise from about 75% to about 95% by weight of rubbery segments and from about 5% to about 25% by weight of non-rubbery segments.

The non-rubbery segments or hard blocks comprise polymers of mono- and polycyclic aromatic hydrocarbons, and more particularly vinyl-substituted aromatic hydrocarbons which may be monocyclic or bicyclic in nature. The preferred rubbery blocks or segments are polymer blocks of homopolymers or copolymers of aliphatic conjugated dienes. Rubbery materials such as polyisoprene, polybutadiene, and styrene butadiene rubbers may be used to form the rubbery block or segment. Particularly preferred rubbery segments include polydienes and saturated olefin rubbers of ethylene/butylene or ethylene/propylene copolymers. The latter rubbers may be obtained from the corresponding unsaturated polyalkylene moieties such as polybutadiene and polyisoprene by hydrogenation thereof.

The block copolymers of vinyl aromatic hydrocarbons and conjugated dienes which may be utilized include any of those which exhibit elastomeric properties.

The block copolymers may be diblock, triblock, multiblock, starblock, polyblock or graftblock copolymers. Throughout this specification and claims, the terms diblock, triblock, multiblock, polyblock, and graft or grafted-block with respect to the structural features of block copolymers are to be given their normal meaning as defined in the literature such as in the *Encyclopedia of Polymer Science and Engineering*, Vol. 2, (1985) John Wiley & Sons, Inc., New York, pp. 325–326, and by J. E. McGrath in *Block Copolymers, Science Technology*, Dale J. Meier, Ed., Harwood Academic Publishers, 1979, at pages 1–5.

Such block copolymers may contain various ratios of conjugated dienes to vinyl aromatic hydrocarbons including those containing up to about 40% by weight of vinyl aromatic hydrocarbon. Accordingly, multi-block copolymers may be utilized which are linear or radial symmetric or asymmetric and which have structures represented by the formulae A-B, A-B-A, A-B-A-B, B-A-B, $(AB)_{0,1,2}$ . . . BA, etc., wherein A is a polymer block of a vinyl aromatic hydrocarbon or a conjugated diene/vinyl aromatic hydrocarbon tapered copolymer block, and B is a rubbery polymer block of a conjugated diene.

The block copolymers may be prepared by any of the well-known block polymerization or copolymerization procedures including sequential addition of monomer, incremental addition of monomer, or coupling techniques as illustrated in, for example, U.S. Pat. Nos. 3,251,905; 3,390,207; 3,598,887; and 4,219,627. As is well known, tapered copolymer blocks can be incorporated in the multi-block copolyrriers by copolymerizing a mixture of conjugated diene and vinyl aromatic hydrocarbon monomers utilizing the difference in their copolymerization reactivity rates. Various patents describe the preparation of multi-block copolymers containing tapered copolymer blocks including U.S. Pat. Nos. 3,251,905; 3,639,521; and 4,208,356, the disclosures of which are hereby incorporated by reference.

Conjugated dienes which may be utilized to prepare the polymers and copolymers are those containing from 4 to about 10 carbon atoms and more generally, from 4 to 6 carbon atoms. Examples include from 1,3-butadiene, 2-methyl-1,3-butadiene (isoprene), 2,3-dimethyl-1,3-butadiene, chloroprene, 1,3-pentadiene, 1,3-hexadiene, etc. Mixtures of these conjugated dienes also may be used. The preferred conjugated dienes are isoprene and 1,3-butadiene.

Examples of vinyl aromatic hydrocarbons which may be utilized to prepare the copolymers include styrene and the various substituted styrenes such as o-methyl styrene, p-methylstyrene, p-tert-butylstyrene, 1,3-dimethylstyrene, alpha-methylstyrene, beta-methylstyrene, p-isopropylstyrene, 2,3-dimethylstyrene, o-chlorostyrene, p-chlorostyrene, o-bromostyrene, 2-chloro-4-methylstyrene, etc. The preferred vinyl aromatic hydrocarbon is styrene.

Many of the above-described copolymers of conjugated dienes and vinyl aromatic compounds are commercially available. The number average molecular weight of the block copolymers, prior to hydrogenation, is from about 20,000 to about 500,000, preferably from about 40,000 to about 300,000.

The average molecular weights of the individual blocks within the copolymers may vary within certain limits. In most instances, the vinyl aromatic block will have a number average molecular weight in the order of about 2000 to about 125,000, and preferably between about 4000 and 60,000. The conjugated diene blocks either before or after hydrogenation will have number average molecular weights in the order of about 10,000 to about 450,000 and more preferably from about 35,000 to 150,000.

Also, prior to hydrogenation, the vinyl content of the conjugated diene portion generally is from about 10% to about 80%, and the vinyl content is preferably from about 25% to about 65%, particularly 35% to 55% when it is desired that the modified block copolymer exhibit rubbery elasticity. The vinyl content of the block copolymer can be measured by means of nuclear magnetic resonance.

Specific examples of diblock copolymers include styrene-butadiene (SB), styrene-isoprene (SI), and the hydrogenated derivatives thereof. Examples of triblock polymers include styrene-butadiene-styrene (SBS), styrene-isoprene-styrene (SIS), alpha-methylstyrene-butadiene-alpha-methylstyrene, and alpha-methylstyrene-isoprene alpha-methylstyrene. Examples of commercially available block copolymers useful as the adhesives in the present invention include those available from Kraton Polymers and listed in the following Table II.

TABLE II

| Kraton | Type | Styrene/Rubber Ratio (w) | % S1 | Melt Index |
|---|---|---|---|---|
| D1101 | Linear SBS | 31/69 | — | <1 |
| D1107P | Linear SIS/SI | 15/85 | 20 | 11 |
| D1111 | Linear SIS | 22/78 | — | 3 |
| D1112P | Linear SIS/SI | 15/85 | 40 | 23 |
| D1113P | Linear SIS/SI | 16/84 | 50 | 24 |
| D1117P | Linear SIS | 17/83 | — | 33 |
| D1320X | Multi-arm $(SI)_n$ | 10/90 | — | NA |

Vector 4111 is an SIS block copolymer available from Dexco of Houston Tex. Vector 4113 is an SIS/SI polymer containing 18% 51 and Vector 4114 also is an SIS/SI polymer which contains 42% SI.

Upon hydrogenation of the SBS copolymers comprising a rubbery segment of a mixture of 1,4 and 1,2 isomers, a styrene-ethylene-butylene styrene (SEBS) block copolymer is obtained. Similarly, hydrogenation of an SIS polymer yields a styrene-ethylene propylene-styrene (SEPS) block copolymer. An example of a commercially available SEPS block copolymer is Kraton G-1730.

The selective hydrogenation of the block copolymers may be carried out by a variety of well known processes including hydrogenation in the presence of such catalysts as Raney nickel, noble metals such as platinum, palladium, etc., and soluble transition metal catalysts. Suitable hydrogenation processes which can be used are those wherein the diene-containing polymer or copolymer is dissolved in an inert hydrocarbon diluent such as cyclohexane and hydrogenated by reaction with hydrogen in the presence of a soluble hydrogenation catalyst. Such procedures are described in U.S. Pat. Nos. 3,113,986 and 4,226,952, the disclosures of which are incorporated herein by reference. Such hydrogenation of the block copolymers which are carried out in a manner and to extent as to produce selectively hydrogenated copolymers having a residual unsaturation content in the polydiene block of from about 0.5% to about 20% of their original unsaturation content prior to hydrogenation.

In one embodiment, the conjugated diene portion of the block copolymer is at least 90% saturated and more often at least 95% saturated while the vinyl aromatic portion is not significantly hydrogenated. Particularly useful hydrogenated block copolymers are hydrogenated products of the block copolymers of styrene-isoprene-styrene such as a styrene-(ethylene/propylene)-styrene block polymer. When a polystyrene-polybutadiene-polystyrene block copolymer is hydrogenated, it is desirable that the 1,2-polybutadiene to 1,4-polybutadiene ratio in the polymer is from about 30:70 to about 70:30. When such a block copolymer is hydrogenated, the resulting product resembles a regular copolymer block of ethylene and 1-butene (EB). As; noted above, when the conjugated diene employed as isoprene, the resulting hydrogenated product resembles a regular copolymer block of ethylene and propylene (EP).

A number of selectively hydrogenated block copolymers are available commercially from Shell Chemical Company under the general trade designation "Kraton G." One example is Kraton G1652 which is a hydrogenated SBS triblock comprising about 30% by weight of styrene end blocks and a midblock which is a copolymer of ethylene and 1-butene (EB). A lower molecular weight version of G1652 is available from Shell under the designation Kraton G1650. Kraton G1651 is another SEBS block copolymer which contains about 33% by weight of styrene. Kraton G1657 is an SEBS diblock copolymer which contains about 13%w styrene. This styrene content is lower than the styrene content in Kraton G 1650 and Kraton G1652. Kraton RP6919 is a SEBSI block copolymer.

In another embodiment, the selectively hydrogenated block copolymer is of the formula

wherein n=0 or 1;

o is 1 to 100;

p is 0 or 1;

each B prior to hydrogenation is predominantly a polymerized conjugated diene hydrocarbon block having a number average molecular weight of about 20,000 to about 450,000;

each A is predominantly a polymerized vinyl aromatic hydrocarbon block having a number average molecular weight of from about 2000 to about 115,000; the blocks of A constituting about 5% to about 95% by weight of the copolymer; and the unsaturation of the block B is less than about 10% of the original unsaturation. In other embodiments, the unsaturation of block B is reduced upon hydrogenation to less than 5% of its original value, and the average unsaturation of the hydrogenated block copolymer is reduced to less than 20% of its original value.

The block copolymers may also include functionalized polymers such as may be obtained by reacting an alpha, beta-olefinically unsaturated monocarboxylic or dicarboxylic acid reagent onto selectively hydrogenated block copolymers of vinyl aromatic hydrocarbons and conjugated dienes as described above. The reaction between the carboxylic acid reagent in the graft block copolymer can be effected in solutions or by a melt process in the presence of a free radical initiator.

The preparation of various selectively hydrogenated block copolymers of conjugated dienes and vinyl aromatic hydrocarbons which have been grafted with a carboxylic acid reagent is described in a number of patents including U.S. Pat. Nos. 4,578,429; 4,657,970; and 4,795,782, and the disclosures of these patents relating to grafted selectively hydrogenated block copolymers of conjugated dienes and vinyl aromatic compounds, and the preparation of such compounds are hereby incorporated by reference. U.S. Pat. No. 4,795,782 describes and gives examples of the preparation of the grafted block copolymers by the solution process and the melt process. U.S. Pat. No. 4,578,429 contains an example of grafting of Kraton G1652 (SEBS) polymer with maleic anhydride with 2,5-dimethyl-2,5-di(t-butylperoxy) hexane by a melt reaction in a twin screw extruder. (See Col. 8, lines 40–61.)

Examples of commercially available maleated selectively hydrogenated copolymers of styrene and butadiene include Kraton FG1901X, FG1921X, and FG1924X from Shell, often referred to as maleated selectively hydrogenated SEBS copolymers. FG1901X contains about 1.7%w bound functionality as succinic anhydride and about 28%w of styrene. FG1921X contains about 1%w of bound functionality as succinic anhydride and 29%w of styrene. FG1924X contains about 13% styrene and about 1% bound functionality as succinic anhydride.

Useful block copolymers also are available from Nippon Zeon Co., 2-1, Marunochi, Chiyoda-ku, Tokyo, Japan. For example, Quintac 3530 is available from Nippon Zeon and is believed to be a linear styrene-isoprene-styrene block copolymer.

Other examples of useful commercially available adhesive or adhesive components include: hot melt rubber based PSAs S-246, C-2500 and C-2110 from the Fasson Division of Avery Dennison Corporation; S-490, an acrylic emulsion PSA also from Fasson; hot melt PSAs from National Starch under the designation Duro Tak 34-424A; low molecular weight polyisobutylene polymers such as Vistanex LM-MS-LC, Vistanex LM-MM-LC and Vistanex LM-MH-LC from Exxon Chemical Company; low density polyethylene such as LD509 from Exxon-Mobil; EVA such as UE 639-67 (containing 28% VA) available from Equistar Chemicals LP, Houston, Tex.; etc.

The polymer film materials and adhesive compositions used to form the constructions of the present invention may be neat, or they may be emulsions or solvent-based. Emulsion and solvent-based acrylic based PSAs are known and described in, for example, U.S. Pat. Nos. 5,639,811 and 5,164,444, respectively, and these patents are hereby incorporated by reference for such disclosures. When emulsions of the film materials and/or adhesive compositions are used, the water may be removed in an extruder by using the process described and claimed in U.S. Pat. No. 5,716,669 (LaRose et al). It is preferred, however, that the film materials and PSAs which are coextruded are compositions substantially free (e.g., less than 1%w) of water and/or solvents. The presence of water or solvents during the coextrusion process can result, and generally does result, in pinholes and bubbles in the coextruded film. The presence of voids in the film due to steam is referred to in the art as "moisture slits."

When the adhesive composites used in the present invention are formed by coextruding a film of the above described polymeric film materials and an adhesive layer as described more fully below, the hot melt viscosity of the polymeric film material and of the adhesive should be within a window or range of viscosities which can produce a coextrudate of continuous and uniform layers of the polymeric film material and the adhesive in order to avoid film defects and intermingling of the polymeric film material and the adhesive during the coextrusion process. Intermingling of the film material and the adhesive is not desired because it can cause a loss of clarity in the extruded film, as well as a tendency to cause blocking. In general, the polymeric film material will have a hot melt viscosity that is within a factor of from about 0.07 to about 20 or even 50 times the hot melt viscosity of the adhesive at the shear rates incurred during the coextrusion process. Generally the shear rates range from about 10 sec-$^1$ to about 10,000 sec-$^1$. More often the factor is from about 1 to about 20. In another embodiment, the factor is from 1 to about 10. It is also desirable for the polymer film material and the adhesive to have relatively similar melt viscosities at the extrusion temperatures. For example, when the PSA is a conventional hot melt adhesive, the extrusion temperatures of the PSA are in the range of from about 150° C. to about 260° C., or in the range of from about 175° C. to about 200° C. It is, therefore, desired that the polymeric film material selected for use with the PSA have an extrusion temperature below about 260° C. and preferably in the range of from about 150° C. to about 180° C.

In one embodiment, the coextruded adhesive composites used in the present invention may have a thickness of from about 0.1 to about 10 mils.

In another embodiment, the features of the coextruded adhesive composites used in the present invention include (1) the use of a thin polymeric film and (2) an adhesive layer having a relatively low coat weight. Thus, the adhesive composites used in the present invention are characterized as having a polymer film with a thickness of from about 0.1 mil up to about 1.5 or 2 mils, and an adhesive coating weight of less than 40, and preferably less than 20 g/m$^2$. In one embodiment, the adhesive layer has a coat weight in the range of from about 2 to 8 g/m$^2$. In another embodiment, the adhesive coat weight is from about 4 to 5 g/m$^2$. Alternatively, the thickness of the adhesive layer may range from about 0.02 mils to about 2 mils, and more often, between about 0.15 mils and about 0.2 mils. It should be understood that the thickness and coat weight of both the polymer film and the adhesive layer may vary depending upon the different types of polymer film material and adhesives that are selected, and the properties desired in the adhesive composite. For example, different polymers and different film thicknesses will result in constructions having different conformabilities and different stiffnesses.

As mentioned above, in one embodiment, the adhesive compositions used to prepare the adhesive composites comprise thermoplastic elastomers comprising at least one thermoplastic elastomeric block copolymer which include linear, branched, graft or radial block copolymers. In addition, the adhesive compositions which are coextruded also contain at least one solid tackifier resin component. A solid tackifier is defined herein as one having a softening point above 80° C. When the solid tackifier resin component is present, the coextrudable pressure-sensitive adhesive compositions generally comprise from about 40 to about 80% by weight of a thermoplastic elastomer component and from about 20% to about 60% by weight (preferably from about 55 to 65% by weight) of a solid tackifier resin component. The solid tackifier reduces the modulus of the mixture sufficiently to build tack or adhesion. Also, solid tackifiers (particularly the higher molecular weight solid tackifiers (e.g., Mw greater than 2000) and those having a lower dispersity (Mw/Mn=less than about 3)) are less sensitive to migration into the polymer film layer, and this is desirable, since migration of tackifier into the polymer film layer causes dimensional instability, and the constructions can swell and/or wrinkle, and may become too soft. In addition, the constructions may lose adhesive properties or cause blocking, and the ability of the polymer film to be printed satisfactorily may be reduced by migration of the tackifier. For example, attempts to print the polymeric film layer after migration of tackifier or other components from the adhesive layer may result in poor anchorage of the ink and/or blurring of the printing. Migration of the tackifier and other components present in the adhesive layer is a particular problem when the polymer film comprises a polyolefin such as polyethylene.

Conventional solid tackifier resins include hydrocarbon resins, rosin, hydrogenated rosin, rosin esters, polyterpene resins, and other resins which exhibit the proper balance of properties. A variety of useful solid tackifier resins are available commercially such as terpene resins which are sold under the trademark Zonatac by Arizona Chemical Company, and petroleum hydrocarbons resins such as the resins sold under the trademark Escorez by Exxon Chemical Company. One particular example of a useful solid tackifier is Escorez 2596 which is a $C_5$–$C_9$ (aromatic modified aliphatic) synthetic tackifier having an Mw of 2100 and a dispersity (Mw/Mn) of 2.69. Another useful solid tackifier is Escorez 1310LC, identified as an aliphatic hydrocarbon resin having an Mw of 1350 and a dispersity of 1.8. Wingtack 95 is a synthetic tackifier resin available from Goodyear, Akron, Ohio consisting predominantly of polymerized structure derived from piperylene and isoprene. Regalrez 1094 and Regalrez 6108 are hydrogenated solid tackifiers available from Hercules. The adhesive compositions also may include one or more hydrogenated liquid tackifiers such as Regalrez 1018 from Hercules. The amount of the hydrogenated liquid tackifier included in the adhesive compositions may range from about 0.1 to about 20% by weight based on the weight of resin or rubber in the adhesive. In another embodiment, from about 5% to about 15% by weight of the hydrogenated liquid tackifier is included in the adhesive formulations.

The modulus of the adhesive mixtures to be coextruded also may be lowered by the incorporation of liquid rubbers, i.e., liquid at room temperature. The liquid rubbers generally will have an Mw of at least 5,000 and more often at least 20,000. Incorporation of liquid rubbers in amounts of less than 10%, and even less than 5% by weight based on the overall weight of the adhesive formulation results in adhesives which is coextrudable with the polymeric film materials. The incorporation of a liquid rubber also produces an adhesive having increased tack and adhesion. Liquid block copolymers such as liquid styrene-isoprene block copolymers are particularly useful. For example, Kraton LVSI-101, available from the Kraton Polymers, is effective in lowering the modulus of the adhesive, and it has been found, surprisingly, that this liquid styrene-isoprene block copolymer functions as a processing aid, improving the smoothness of the flow of the adhesive from the die. Kraton LVSI-101 has a weight average molecular weight of about 40,000. Another example of a useful liquid rubber is a liquid polyisoprene obtained by selectively or partially degrading a high molecular weight polyisoprene. An example of a commercially available partially degraded high molecular weight polyisoprene is Isolene D-400 from Elementis Performance Polymers, Belleville, N.J., and this liquid rubber has an Mw of about 20,000. Other liquid rubbers which may be incorporated into the adhesive mixture include liquid styrene-butadiene rubbers, liquid butadiene rubbers, ethylene-propylene rubbers, etc.

The adhesive compositions also may include other materials such as antioxidants, heat and light stabilizers, ultraviolet light absorbers, viscosity modifiers, fillers, colorants, antiblocking agents, reinforcing agents, processing acids, mineral oil, etc. Hindered phenolic and amine antioxidant compounds may be included in the adhesive compositions, and a wide variety of such antioxidant compounds are known in the art. The amount of antioxidant can be varied, and in one embodiment from about 0.01 to about 1% by weight or more, based on the total weight of resin and rubber in the adhesive, is used. A variety of antioxidants are available from Ciba-Geigy under the general trade designations "Irganox" and "Irgafos". For example, the hindered phenolic antioxidant n-octadecyl 3-(3,5-di-t-butyl-4-hydroxyphenol)-proprionate is available under the general trade designation "Irganox 1076". Irganox 1010, is identified as Tetrakis (methylene 3-(3',5'-di-tert-butyl-4'-hydroxyphenol) proprionate) methane. Irgafos 168 is another useful antioxidant from Ciba-Geigy.

Hydroquinone-based antioxidants also may be utilized, and one example of such an antioxidant is 2,5-di-tertiary-amyl-hydroquinone.

Light stabilizers, heat stabilizers, and UV absorbers also may be included in the adhesive compositions. Ultraviolet absorbers include benzo-triazol derivatives, hydroxy benzyl phenones, esters of benzoic acids, oxalic acid, diamides, etc. Light stabilizers include hindered amine light stabilizers, and the heat stabilizers include dithiocarbamate compositions such as zinc dibutyl dithiocarbamate.

The adhesive composition may also contain mineral oil such as white mineral oil in amounts of from about 0.01 to about 15 or 20% by weight. In one embodiment, the adhesive formulation contains from about 5% to about 15% by weight of a mineral oil. An example of a useful commercial white mineral oil is Kaydol Oil from Witco Chemical.

The adhesive compositions, like the polymeric films, may contain inorganic fillers and other organic and inorganic additives to provide desired properties. Examples of useful fillers include calcium carbonate, titanium dioxide, metal particles, fibers, etc. An example of a useful end-block reinforcing agent is Cumar LX509 from Neville Resins.

The following examples illustrate specific pressure sensitive adhesive formulations which are useful in preparing the adhesive composites, and particularly the coextruded adhesive composites. Unless otherwise indicated in the following examples, in the claims, and elsewhere in the written description, all parts and percentages are by weight, and temperatures are in degrees centigrade.

| | Parts By Weight |
|---|---|
| Adhesive 1 | |
| Kraton D1320X | 60.0 |
| Escorez 2596 | 40.0 |
| Adhesive 2 | |
| Kraton D1320X | 57.1 |
| Escorez 2596 | 38.1 |
| Kraton LVSI-101 | 4.8 |
| Adhesive 3 | |
| Kraton D1320X | 50.0 |
| Escorez 2596 | 45.8 |
| Kraton LVSI-101 | 4.2 |
| Adhesive 4 | |
| Quintac 3530 | 50.0 |
| Escorez 2596 | 45.8 |
| Kraton LVSI-101 | 4.2 |
| Adhesive 5 | |
| Quintac 3530 | 50.0 |
| Escorez 2596 | 45.8 |
| Isolene D-400 | 4.2 |
| Adhesive 6 | |
| Kraton D1112P | 35.0 |
| Escorez 1310LC | 65.0 |
| Adhesive 7 | |
| Kraton D1117P | 35.0 |
| Escorez 1310LC | 65.0 |
| Adhesive 8 | |
| Kraton D1112P | 35.0 |
| Escorez 2596 | 65.0 |
| Adhesive 9 | |
| Kraton D1107 | 30.0 |
| Escorez 2596 | 48.0 |
| Kraton LVSI-101 | 22.0 |
| Adhesive 10 | |
| Vector 4111 | 52.6 |
| Wingtack 95 | 31.6 |
| Cumar LX509 | 15.8 |
| Adhesive 11 | |
| Kraton D1113 | 54.6 |
| Duro Tak 34-424A | 45.4 |
| Adhesive 12 | |
| Kraton G-1657 | 60.0 |
| Regalrez 1094 | 40.0 |
| Adhesive 13 | |
| Kraton G-1730 | 60 |
| Regalrez 6108 | 40 |
| Adhesive 14 | |
| Kraton RP-6919 | 35 |
| Regalrez 1094 | 55 |
| Kaydol Oil | 10 |
| Adhesive 15 | |
| Kraton RP-6919 | 35 |
| Regalrez 1094 | 55 |
| Kraton LVSI-101 | 10 |
| Adhesive 16 | |
| Kraton G-1657 | 35 |
| Regalrez 1094 | 55 |
| Regalrez 1018 | 10 |
| Adhesive 17 | |
| Fasson S-246 | 70 |
| Kraton D-1113 | 30 |
| Adhesive 18 | |
| Kraton D-1117 | 66.7 |
| Duro Tak 34-424A | 33.3 |
| Adhesive 19 | |
| Quintac 3530 | 50.0 |

-continued

| | Parts By Weight |
|---|---|
| Escorez 2596 | 45.8 |
| Kraton LVSI-101 | 4.2 |
| Irganox 565 | 0.3* |
| Irgafos 168 | 0.3* |
| Adhesive 20 | |
| | |
| Kraton 1107 | 75 |
| Escorez 2596 | 25 |
| Kraton LVSI-101 | 5 |
| Irganox 1010 | 0.3* |
| Irganox 1076 | 0.3* |
| Adhesive 21 | |
| | |
| LDPE LD-509 | 50.0 |
| Duro Tak 34-424A | 50.0 |
| Adhesive 22 | |
| | |
| Vistanex LM-MH-CL | 66.7 |
| LD-509 | 33.3 |
| Adhesive 23 | |
| | |
| Kraton G-1730 | 60 |
| Regalrez 6108 | 40 |

*parts per hundred parts of resin and rubber in formulation

As noted above, in one embodiment, the adhesive composites used in the present invention comprise coextrudates of a polymeric film and an adhesive layer. The polymeric film may comprise one or more layers.

One coextrusion technique useful in preparing an embodiment of the adhesive composites used in the present invention is schematically shown in FIG. 1. The apparatus shown in FIG. 1 utilizes three extruders (e.g., melt pumps) 10, 11 and 12 which can provide three molten streams (sometimes hereinafter referred to as streams A, B and C respectively) of material to the coextrusion die 17. Extruder 10 provides a molten stream 13 of an adhesive composition to the die 17. Extruder 11 provides a molten stream 14 of polymeric film material to the die 17. Extruder 12 is optional, and when present, provides a molten stream 15 of a polymeric film material which may be the same as or different from the polymer film material of molten stream 14 from extruder 11. It is of course understood that if no third molten stream is desired, there is no need to utilize extruder 12. When extruder 12 is utilized, and the molten stream 15 is a polymer film material which is the same as the polymer film material of molten stream 14, the resulting coextrudate is a two layer construction, one layer of polymer film and one layer of adhesive. When the polymeric film material of molten stream 15 is different from the polymeric film material of molten stream 14, the polymeric film of the coextrudate 23 comprises two layers (31 and 31A in FIG. 1B), and the coextrudate comprises three layers, the two polymer film layers (31 and 31A) and the adhesive layer 30. Additional extruders can be used when it is desired to have additional streams of molten material fed to the die 17. Two or more extruders containing the same polymeric film material are used to provide a coextrudate with a thicker polymeric film.

In one preferred embodiment, polymer film material is not charged to extruder 12, or the polymer charged to extruder 12 is the same as that charged to extruder 11, and the resulting coextrudate comprises a single layer of polymer film, and a layer of adhesive.

The extruders 10, 11 and 12 are utilized to blend and melt the compositions and as pumps to deliver the molten streams to the feedblock and the extrusion die. Alternatively, the compositions may be preblended prior to being introduced into the extruders. The precise extruder utilized is not critical to the process. A number of useful extruders are known, and these include single and twin-screw extruders, batch-off extruders, melt pumps, batch melters, etc. Such extruders are available from a variety of commercial sources including Killion Extruders, Inc., C.W. Brabender Inc., American Leistritz Extruder Corp, Nordson, and Davis Standard Corp.

A variety of useful coextrusion die systems are known. Examples of extrusion dies useful in the invention are the Cloeren "vane" dies, and multimanifold dies available commercially from the Cloeren Company of Orange, Tex.

Although the selection of the extrusion die to be utilized in the process of the invention is not critical, certain factors do have an influence on the performance of the extrusion process. For example, when a single manifold is to be utilized, the relative viscosities of the materials, and their ability to be processed at a single manifold temperature must be considered. When the relative viscosities of the materials exceed a tolerable limit, or when a single manifold temperature cannot be tolerated by the materials, multimanifold dies are typically employed. In multimanifold dies, each material flows in its own manifold to the point of confluence. Each individual manifold also can be designed specifically for the rheology of each polymer resin and/or adhesive, and each manifold also can be controlled at different process temperatures.

Multimanifold dies can be designed with zero common land length so that the materials; do not meet until the die lip or exit orifice. Alternatively, they can be designed with a short common flow channel such as, example, up to about 10 mm, and preferably less than about 5 mm. A zero common land would be preferred where the molten streams have extreme viscosity differences and/or temperature requirements. A short common land is generally beneficial because the period of high temperatures and high pressure while the melts are in the common land can improve the bond strength between the layers of the construction and minimize or eliminate air entrainment. In one embodiment of the present invention, the manifold dies are selected so that the molten streams are joined about 1 mm before the die lip. In another embodiment the manifold dies have separate openings so that the different molten materials do not meet until after they have passed through the exit.

Referring again to FIG. 1, the unified molten structure 19 of two or more layers exits the extrusion die 17 through orifice 18, and the molten structure is deposited onto a solid substrate 21 (e.g., a release liner) supplied from a roll 20 so that the lower surface of the adhesive layer is in contact with the liner, while the upper surface of the polymeric film is in contact with air. The liner 21 is partially wrapped around the first of a three chill roll stack 22, 22A and 22B. Chill roll 22 also acts as a casting roll. The liner 21 contacts the surface of casting roll 22 and is interposed between the surface of the casting roll and the adhesive layer of the molten stream 19. In the embodiment illustrated in FIG. 1, the molten structure 19 is deposited on the liner 21 and the construction 23 which is formed in the process then passes over chill rolls 22A and 22B and is wound over roll 24 or wound upon itself.

The casting/cooling roll 22 and the chill rolls 22A and 22B typically are maintained at a temperature below the temperature of the unified molten structure 19 in order to cool the molten structure after it is deposited on the liner. Typically this temperature is in the range of from about 5° to about 100° C., preferably from about 20° to about 30° C.

In another embodiment, a linerless adhesive construction can be prepared by substituting for rolls 22, 22A, and 22B, rolls which are coated with a release surface. The use of release coated surfaces allows the unified molten structure to pass around the chill rolls without need of a release liner thus forming a linerless adhesive construction. When release coated rolls are used, the temperatures of the rolls also are typically below the temperature of the unified molten structure 19 in order to cool the molten structure after it is deposited on the release coated rolls. With release coated rolls, slightly higher temperatures such as up to about 125° C., preferably up to about 50° C. may be utilized to reduce slippage of the film on the rolls.

Figure 1A:
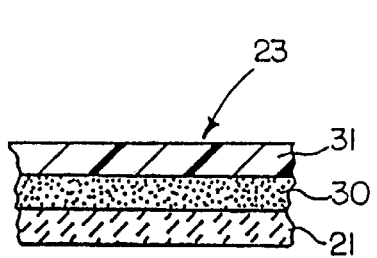
FIG. 1A is a cross-sectional side view of a face film/adhesive composite construction as prepared in FIG. 1 useful in the present invention.
Figure 1B:
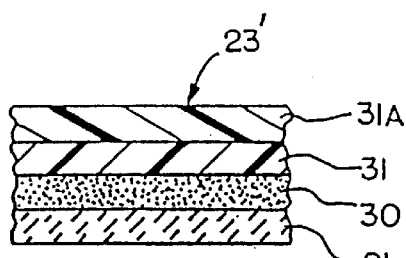
FIG. 1B is a cross-sectional side view of another face film/adhesive composite construction as prepared in FIG. 1 and useful in the present invention.

FIG. 1A is a cross-section of the adhesive composite 23 of one embodiment useful in the present invention wherein the polymeric film is a monolayer. Thus, the adhesive composite 23 illustrated in FIG. 1A comprises the polymer film layer 31, an adhesive layer 30, and a release liner 21. FIG. 1B is a cross-section of an adhesive composite 23' useful in the present invention in which the face film comprises two layers. Such composite can be prepared in accordance with the process illustrated in FIG. 1 wherein an adhesive composition is supplied to extruder 10, and different polymer film materials are supplied to extruders 11 and 12 of FIG. 1. The resulting adhesive composite illustrated in FIG. 1B comprises polymer film layers 31 and 31A (derived from the film materials supplied to extruders 11 and 12, respectively), an adhesive layer 30, and a release liner 21.

Figure 2:
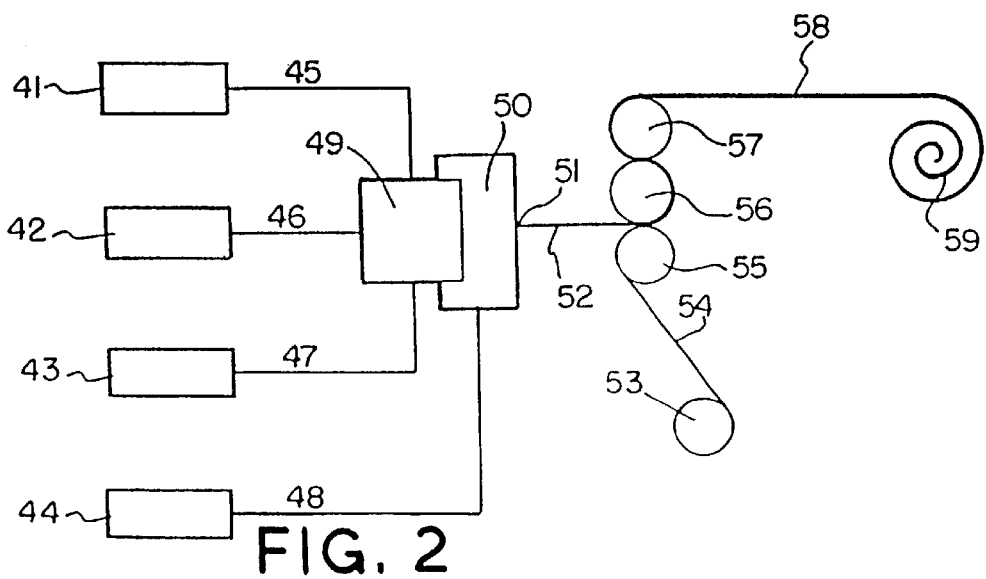
FIG. 2 is a schematic side elevation of another method of making a face film/adhesive composite construction useful in the present invention.

FIG. 2 illustrates another coextrusion procedure useful in preparing the adhesive composites useful in the present invention. The apparatus shown in FIG. 2 utilizes four extruders 41, 42, 43 and 44 which provide four molten streams (sometimes hereinafter referred to as streams A, B, C and D, respectively) of material. Extruders 41, 42 and 43 provide molten streams 45, 46 and 47, respectively, to a feedblock 49, and extruder 44 provides a molten stream 48 of an adhesive composition directly to the die 50. As in the procedure shown in FIG. 1 and described above, the molten streams of polymer film material exiting extruders 41, 42 and 43 may be the same or different, although it is preferred, in one embodiment, that the polymeric film materials exiting extruders 41, 42 and 43 are the same. Three extruders containing the same polymeric film material are used to provide a coextrudate with a thicker polymeric film.

Feedblock 49 in FIG. 2 combines the molten streams of polymeric film material into a single flow channel. The feedblock 49 delivers the molten structure to the extrusion die 50 where the molten structure is combined with the adhesive stream 48, and thereafter the combined streams are reduced in height and increased in width as desired so as to provide a relatively thin and wide construction. An example of a useful feedblock is the Cloeren coextrusion feedblock available commercially from the Cloeren Company of Orange, Tex. The discussion above, with regard to the selection of the extrusion die used in the process of FIG. 1 is applicable to the process of FIG. 2.

The unified molten structure 52 of two or more layers exits the extrusion die 50 through orifice 51, and the molten structure is deposited onto a solid substrate 54 (e.g., a release liner) supplied from a roll 53 so that the lower surface of the adhesive layer is in contact with the liner, while the upper surface of the polymeric film is in contact with air. The liner 54 is partially wrapped around the first of a three chill roll stack 55, 56 and 57. Chill roll 55 also acts as a casting roll. The liner 54 contacts the surface of the casting roll 55 and is interposed between the surface of the casting roll and the adhesive layer of the molten stream 52. In the embodiment illustrated in FIG. 2, the molten structure 52 is deposited on the liner 54, and the construction 58 which is formed in the process then passes over chill rolls 56 and 57 and is wound over roll 59 or wound upon itself. The casting/cooling roll 55, and chill rolls 56 and 57 typically are maintained at a temperature below the temperature of the unified molten structure 52 in order to cool the molten structure after it is deposited on the liner. Typically this temperature is in the range of from about 5° C. to about 100° C., preferably from about 20° C. to about 30° C.

A number of additional steps optionally can be performed on the coextruded adhesive composites if desired. Thus, for example, the coextrudate may be uniaxially or biaxially oriented (e.g., by heat stretching and heat setting). If it is desired to uniaxially or biaxially orient the coextruded adhesive constructions of the present invention, such orientation preferably occurs before the coextrudate is joined with a support material such as the release liner 21 and 54 of FIGS. 1 and 2 respectively. For example, if it is desired to orient the coextrudate, the process described with regard to FIGS. 1 and 2 is modified as follows. The flow of molten material into the die and/or feedblock is rearranged so that the unified molten structures 19 and 52, of FIGS. 1 and 2 respectively, have the adhesive layer on top, and the molten film layer contacts the casting/chill roll 22 or 55 where the molten material is cast into a film and cooled. Chill rolls 22A and 22B in FIG. 1, and chill rolls 56 and 57 in FIG. 2 are omitted or rearranged so that the adhesive side of the cast film does not come into contact with the additional chill rolls. After the cast film has cooled, the construction may be subjected to orientation followed by lamination to the release surface of a release liner for storage or protection of the adhesive surface until the subsequent steps required to form the three-dimensional adhesive film construction of this invention are carried out. In one embodiment of the invention, the adhesive constructions are not oriented. In another embodiment, as described more fully below, the cooled cast film is not laminated to a release liner but is directly subjected to the additional steps required to produce the three-dimensional adhesive film structures of the invention as described more fully below.

Machine direction or biaxial orientation of the cooled cast composites prepared as described above free of a release liner can be accomplished by techniques known in the art. For example, the composites can be oriented in the machine direction by using tentering frames where the clips at the edge of the tentering frame travel faster in the machine direction thereby stretching the composite in the machine direction. Alternatively, the clips can be programmed to travel faster in the machine direction or to widen in the cross direction, or to stretch in both directions thereby orienting the composite in both directions. When the composite is to be stretched using a tenter frame, the edges of the film are preferably free of adhesive so that the clips will not stick to the film. After orientation on the tentering frame, the coextruded adhesive composites then can be laminated to a release liner or processed further as described below.

The preparation of coextruded adhesive composites useful in the present invention is illustrated in the following examples.

EXAMPLE 1

The apparatus utilized in this example is generally similar to the apparatus of FIG. 1 and consists of three extruders (a Killion 1" single screw extruder (stream A), a ¾" Brabender single screw extruder (stream B), and a 27 mm Leistritz twin screw extruder in the co-rotating mode (stream C)) and a 6" Cloeren, three layer, three manifold vane die. The adhesive for the adhesive layer of the construction of the invention is fed to the Leistritz twin screw extruder having 9 heated zones which are maintained at 145° C., 155° C., 160° C., 160° C., 160° C., 160° C., 160° C., 155° C., and 155° C. The adaptor is also heated to 155° C., and the first extruder zone is unheated. Kraton D1320X is dusted with 0.1 phr of stabilizers (a 2:1 blend of Irgafos 168 and Irganox 565) and fed through the solids feed-port at the first zone at a rate of 447 g/hr. Kraton LVSI-101 is heated to 120° C. and fed at a rate of 57 g/hr. into the fourth zone. Escorez 1310 is heated to 135° C. and fed at a rate of 407 g/hr. into the sixth zone. The twin screw extruder is operated at 450 rpm and requires 2.8 amps. The Brabender extruder operated at 5 rpm is charged with Unirez 2623. The temperature profile is 150° C., 155° C. and 165° C. in three zones with a head pressure of 600 kPa. Additional Unirez 2623 is charged to the Killion extruder operated at 5 rpm. The third zone of the Killion extruder is heated to 165° C. and maintained at 1380 kPa head pressure. Molten streams from the three extruders are combined inside the Cloeren die set to a temperature of 165° C. whereby the two molten streams (streams A & B) of polyamide are disposed on the molten stream of adhesive (stream C), and streams combine inside the die in such a manner that the adhesive containing side will contact a release liner upon exiting the die. The release liner consists of glassine paper coated with GE 7000-series silicone release on one side. The liner is partially wrapped around the bottom-most chill roll (also casting roll) of a three chill roll stack that is maintained in a closed nip position. The chill rolls are maintained at about 22° C., and the molten stream exiting the die is cast onto the liner wrapped on the bottom-most chill roll. The line speed is about 12 m/min. The resulting extrudate is about 7.5 cm. wide and about 0.5 mils (12 micron) in thickness.

EXAMPLE 2

The procedure of Example 1 is generally followed except that Unirez 2623 is replaced by polypropylene 5E66 from Union Carbide, and the extruder temperatures and the die temperature are raised to 210° C. The Killion extruder is operated at a 5 rpm and the head pressure is 4800 kPa. The Brabender extruder is operated at 8 rpm with a head pressure of 4300 kPa. The Leistritz extruder utilizes the same temperature profile as in Example 1, and the Kraton D1320X, LVSI 101 and Escorez 2596 are handled in the same manner as in Example 1 except the feed rates are 670 g/hr, 76 g/hr and 543 g/hr, respectively. The head pressure on the Leistritz twin screw is 1310 kPa with a melt temperature of 166° C. The adhesive construction with liner is wound at 12 m/min, and the adhesive construction is about 11.5 cm wide and about 0.5 mils (12 micron) thick.

EXAMPLES 3–6

In these examples, the apparatus used is similar to the apparatus of FIG. 2. Two Killion 1" extruders are used for streams A and C. A Davis-Standard 1.5" extruder is used for stream B. A Leistritz twin screw extruder is used for stream D. The Killion extruders are operated at 200° C., and the Davis-Standard extruder is operated at 215° C. The Leistritz extruder is heated according to the following profile: unheated, 145° C., 160° C., 160° C., 170° C., 170° C., 175° C., 175° C., 180° C. and 180° C. The adaptor is heated to 210° C. The speeds of the extruders are varied according to the product desired. The streams A, B and C consists of polypropylene 5E66 from Union Carbide, and these streams are fed through a feedblock into one manifold of an 11" Production Components dual manifold extrusion die. Stream D is a pressure sensitive adhesive which is fed directly into the other manifold of the extrusion dies. The extrudate is cast with adhesive in contact with a release liner, and stream A in contact with the chill roll 56. The chill roll stack is maintained at about 90° C. and the die gap for the ABC layer is set to about 380 microns. The gap for the adhesive layer is about 250 microns. Additional details regarding these four examples, as well as the details of the product, are summarized in the following Table III.

TABLE III

|  | Example 3 | Example 4 | Example 5 | Example 6 |
| --- | --- | --- | --- | --- |
| Killion rpms | 5 | 5 | 2.5 | 2.5 |
| Davis-Standard (%) | 4 | 4 | 2 | 2 |
| Leistritz rpms | 450 | 450 | 450 | 450 |
| Kraton D1320X/AO g/hr | 1013 | 253 | 370 | 1521 |
| Kraton LVSI g/hr | 95 | 24 | 38 | 134 |
| Escorez 2596 g/hr | 950 | 238 | 340 | 1426 |
| Line speed m/min | 6.1 | 6.1 | 9.1 | 9.1 |
| PP film thickness (mu) | 35 | 25 | 5 | 10 |
| Adhesive coatweight (g/m$^2$) | 23 | 5 | .5 | 24 |

The patterned layer of a non-adhesive material which is contained in the three-dimensional flexible adhesive film structures of the present invention may comprise any material which has non-adhesive characteristics, i.e., is not sticky or tacky after drying, and the material anchors well to the adhesive layer. In one embodiment, the non-adhesive material may be referred to as a detackifier since the tacky character of the adhesive is masked by the presence of the non-adhesive material on any portion of the adhesive layer.

Any material that can be placed in solution, dispersion or emulsion and which is not sticky on drying, and which adheres to the adhesive layer can be utilized in the present invention. Thus, the non-adhesive material may be an organic material or an inorganic material, or mixtures thereof. For example, the non-adhesive material may be an ink such as water-based, solvent-based or a radiation-curable ink appropriately chosen for the particular construction of the film structure of the present invention, and/or the particular printing method utilized. Specific examples of inks which can be utilized as a non-adhesive or detackifier material in the present invention include Sun Sheen (a product of Sun Chemical Company identified as an alcohol dilutable polyamide ink), Suntex MP (a product of Sun Chemical Company identified as a solvent-based ink formulated for surface printing acrylic coated substrates, PVDC coated substrates and polyolefin films), X-CEL (a product of Water Ink Technologies identified as a water-based film ink for printing film substrates), Uvilith AR-109 Rubine Red (a product of Daw Ink identified as a UV ink) and CLA 91598F (a product of Sun Chemical identified as a multibond black solvent-based ink). An example of a useful solvent based ink is No-Tox Liquid Ink FGN 4121 and an example of a useful water based ink is No-Tox Liquid Ink FGN 3359, both of which are available from Colorcon, a division of Berwind Pharmaceutical Services, West Point, Pa. The FGN 3359 ink is believed to contain styrene-acrylic polymers.

In another embodiment, the non-adhesive material may be solvent-based or water-based varnish. The varnish may be typically comprised of one or more organic polymers or copolymers such as polyolefins, polyamides, polyesters, polyester copolymers, polyurethanes, polysulfones, polyvinylidene chloride, styrene-maleic anhydride copolymers, styrene-acrylonitrile copolymers, ionomers based on sodium or zinc salts of ethylene methacrylic acid, polymethyl methacrylates, acrylic polymers and copolymers, cellulosic polymers, acetate polymers, polyvinyl chlorides, polycarbonates, polyacrylonitriles, ethylene-vinyl acetate copolymers, and mixtures of two or more thereof dissolved or dispersed in a diluent. Examples of the diluents that can be used include alcohols such as ethanol, isopropanol butanol; esters such as ethyl acetate, propyl acetate, butyl acetate; toluene, xylene; ketones such as acetone, methyl ethyl ketone, mineral spirits and mixtures thereof. The ratio of polymer to diluent is dependent on the viscosity required for the application of the non-adhesive layer, and the selection of such viscosity is within the skill of the art. Example of varnishes that can be used as non-adhesive layer materials include CLBO 4275F-Prokote Primer (a product of Sun chemical Corporation identified as a solvent based primer useful with inks and coatings). The non-adhesive layers utilized in the present invention typically have a thick coating weight of from about 1 to about 5 g/m$^2$ or from about 1 to 2 g/m$^2$.

The layer of non-adhesive material utilized in the film structures of the present invention is a discontinuous or patterned layer, and thus, the layer of non-adhesive material is designed to contain open areas or areas which are free of the non-adhesive material. The layer of non-adhesive material containing open areas or areas free of non-adhesive material are designed so that when the non-adhesive material is brought into contact with and adheres to the adhesive layer of the film structures of the present invention, said open areas which are free of non-adhesive material will be within the depressions of the film structure. Accordingly, in one embodiment the non-adhesive material which adheres to the adhesive layer only partially fills said depressions, and a portion of the adhesive layer within the depression remains uncovered by the non-adhesive material. In another embodiment, the size of the area which is free of non-adhesive material in the non-adhesive material layer is sufficient so that all or substantially all of the adhesive layer within the depression is not covered by the non-adhesive material.

The non-adhesive materials also may comprise various polymers and copolymers including any of the polymers and copolymers which have been described above as useful in forming the polymer face film. Thus, the non-adhesive materials may include materials selected from polystyrenes, polyolefins, polyamides, polyesters, polycarbonates, polyurethanes, polyacrylates, polyvinyl alcohols, poly (ethylenevinyl alcohol), polyvinyl acetates, ionomers, and mixtures thereof.

In some instances, coloring agents or pigments can be included in the non-adhesive material to provide desired aesthetics to the film constructions of the invention. Pigments and other coloring agents can be selected as desired by one skilled in the art.

In one embodiment the non-adhesive material used to form the patterned layer in contact with the adhesive layer is a material which is not tacky under normal conditions but which can be activated on demand to form a tacky layer in contact with the back surface of the adhesive layer thereby providing additional adhesive properties. For example it may be desired in some circumstances to have a more aggressive adhesive bond than is provided by the adhesive layer which is covered by the patterned non-adhesive layer. In one embodiment, a non-adhesive material can be used which can be activated by heat to form a tacky layer. In another embodiment, a non-adhesive material can be selected which is capable of being chemically activated to form the desired tacky surface. In yet another embodiment, a non-adhesive material can be selected which is capable of being heat activated to migrate into the PSA layer to expose the underlaying tacky PSA surface thereby increasing the amount of adhesive surface in contact with a substrate. Heat activation can be effected by heating by conductive, convective or radiative heat transfer means, and chemical activation can be effected by chemicals such as solvents and the like.

Suitable materials which are heat activated to form a tacky surface include heat-seal adhesives, modified heat-seal adhesives; and delayed-action heat seal adhesives that: (1) are good film formers; (2) are capable of covering the underlaying PSA layer; and (3) have inherent properties of open tack. Exemplary materials are thermoplastic heat-seal adhesives selected from polyamide resins, polyester resins, polyurethane resins, polyacrylate resins, copolymers of ethylene and vinyl acetate, and mixtures thereof. Particular examples of thermoplastic polyamicle resins include polyamide resins available from Union Camp of Wayne, N.J. under the Uni-Rez product line. Polyamide resins available from General Mills, Inc. of Minneapolis, Minn. under the Versamid product line also can be used.

Examples of non-adhesive materials that can be rendered adhesive by chemical activation are those that can be activated when exposed to chemicals such as organic or inorganic solvents, e.g., water activatable gums, adhesives, starches, etc; polyvinyl alcohol, polyamides, high gloss transition temperature acrylates, ethylene vinyl acetate copolymers, polyacrylic acid etc; and other chemicals which upon exposure to water, steam, or other inorganic solvents or organic solvents react to form a tacky layer.

Examples of non-adhesive materials which are heat activatable to migrate into the adhesive layer to expose the underlying adhesive layer are formed by combining an about 10%w solids dispersion of the reaction product of one or more bases with one or more polar fatty acids containing from about 10 to about 24 carbon atoms, tall oil rosin acids and/or olefinic polymers having acid functionality. Examples of bases are amines such as ethylenediamine and N,N,N',N'-tetramethyl ethylenediamine. Examples of fatty acids include 12-hydroxy-oxysteric acid, tall oil rosin acids such as Unitol NCY from Union Oil Co., dodecanedioic acid from DuPont, etc.

Additional discussion regarding that heat and chemically activatable non-adhesive materials that can be used in the present invention, as well as additional examples of such materials, and the details of applying an activating such material is formed in copending application serial No. 60/026,819 filed Sep. 27, 1996 and published as WO 98/13199, which application is hereby incorporated by reference for such disclosures.

Procedures for suitably applying the non-adhesive material in a discontinuous or patterned layer include gravure coating, spray coating, melt blowing, flexographic printing such as offset flexographic printing, lithographic printing, or screen printing.

For example, polymer materials such as ethylene vinyl acetate and low viscosity polyethylenes can be applied to the adhesive layer in a patterned layer by hot melt spraying and hot melt coating. Water- and solvent-based varnishes and inks can be applied utilizing flexographic, gravure and screen ink printing techniques or in some instances, print rolls.

In another embodiment, the film constructions comprising the face film, adhesive layer and non-adhesive layer can be formed by coextrusion of the three materials. For example, the face film material and the adhesive material are extruded as continuous films and the non-adhesive material is extruded as a series of discontinuous lanes to form a coextrudate of the three layers.

Figure 3:
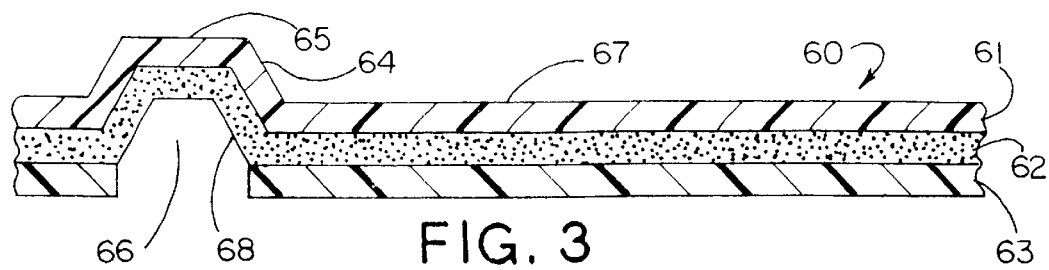
FIG. 3 is a cross-sectional side view of a three-dimensional adhesive film structure of the invention having one protrusion.

Various embodiments of the three-dimensional flexible adhesive film constructions of the present invention are illustrated in FIGS. 3, 4, 5, 5A and 6. FIG. 3 illustrates a three-dimensional film construction of the invention 60 which contains a single protrusion 64. The construction comprises a polymer film layer 61 having an front surface 67 and a back surface; an adhesive layer 62 having an front surface and a back surface wherein the front surface of the adhesive layer 62 is adhered to the back surface of the face film 61; and a patterned or discontinuous layer of non-adhesive 63 having an front surface and a back surface wherein the front surface of the non-adhesive material 63 is in contact with and adhered to a portion of bottom surface of the adhesive layer 62. The film construction 60 contains a hollow protrusion 64 which is illustrated as being conical in shape with truncated or domed outermost end 65. In one embodiment, the protrusion 64 has a height which is preferably less than its diameter so that when the protrusion collapses, it collapses along an axis which is substantially perpendicular to a plane of film 60. This mode of collapse avoids having protrusions 64 folding over and blocking the adhesive from contact with a target surface. The film construction 60 also contains a depression 66 within the hollow protrusion 64. As illustrated in FIG. 3, the back surface 68 of the adhesive layer 62 within the depression 66 is not coated with the non-adhesive material. When a three-dimensional structure as illustrated in FIG. 3 is placed on a target, there is no adhesion to the target until a downward pressure is applied to the end of the protrusion at 65. The length and size of structures illustrated in FIG. 3 (for example, in strip or sheet form) is determined by the ultimate use of the structure. For example the film structure 60 can be in the form of a strip of a length suitable for wrapping around a bandaged body part (e.g., an arm or leg) to protect the body part from infection, moisture etc.

Figure 4:
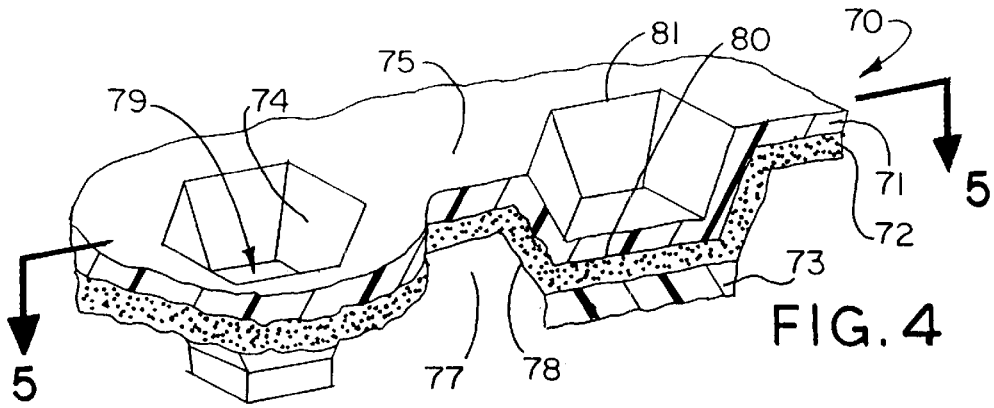
FIG. 4 is a perspective view of an enlarged scale of a three-dimensional adhesive film structure of the invention having a plurality of protrusions.

FIG. 4 is perspective view on an enlarged scale of a three-dimensional adhesive film structure of this invention. Film structure 70 comprises a face film 71 having a front surface 75 and a back surface, an adhesive layer 72 having a front surface and a back surface wherein the front surface is in contact with and adhered to the back surface of the face film 71; and a patterned or discontinuous layer of non-adhesive 73 having an front surface and a back surface wherein the front surface of the adhesive layer is in contact with and adhered to a portion of the back surface of the adhesive layer 72. The sheet has been formed (e.g., by embossing to provide a three-dimensional structure by creating an array of indentations 81 which may be, for example, hexagonal in shape. The indentations form valleys 79. As shown in FIG. 4 the non-adhesive material 73 is adhered to the potion of the back surface of the adhesive layer which is adhered to the back surface of the face film in the valleys 79. The surface of the adhesive layer 78 within the area 77 is free of any non-adhesive material and remains tacky. The area designated 75 in FIG. 4 corresponds to the outermost end 95 on the protrusions 94 in the three-dimensional structure illustrated in FIG. 5.

Figure 5:
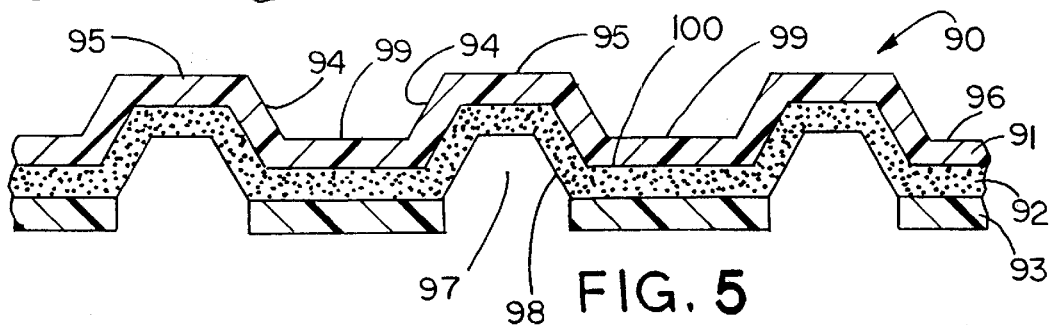
FIG. 5 is a cross-sectional side view of the three-dimensional adhesive film structure of FIG. 4 taken along section line 5—5.

FIG. 5 illustrates a cross section of a three-dimensional flexible adhesive film construction of the present invention like FIG. 4 taken along section line 5-5. The film construction 90 comprises a face layer 91 having a front surface 96 and a back surface; an adhesive layer 92 having a front surface and a back surface wherein the front surface is in contact with and adhered to the back surface of the face layer 91; and a patterned or discontinuous layer of a non-adhesive material 93 having a front surface and a back surface wherein the front surface of the non-adhesive material 93 is in contact with and adhered to a portion of the back surface of the adhesive layer 92. The film construction 90 contains hollow protrusions 94 which are illustrated as being conical in shape with truncated or domed outermost ends 95. The film construction 90 also contains a plurality of depressions 97 in the adhesive layer 92 which correspond to and are within the plurality of hollow protrusions 94. In the embodiment of FIG. 5, the back surface 98 of the adhesive layer 92 within the depressions 97 is not coated with the non-adhesive material.

The protrusions 94 in the construction 90 of FIG. 5 are separated from each other by valleys 99. In the embodiment illustrated in FIG. 5, the non-adhesive material 93 is in contact with and adhered to that portion of the adhesive layer 92 which is adhered to the back surface 100 of the valleys 99 in the face film 91. Since the only exposed adhesive surfaces in the embodiment illustrated in FIG. 5 are within the depressions 97 of the protrusions 94, the three-dimensional adhesive film construction does not exhibit any tack properties when contacting a target surface unless a downward pressure is applied to the outermost end 95 of the protrusion 94 from the face film side of the construction.

Figure 5A:
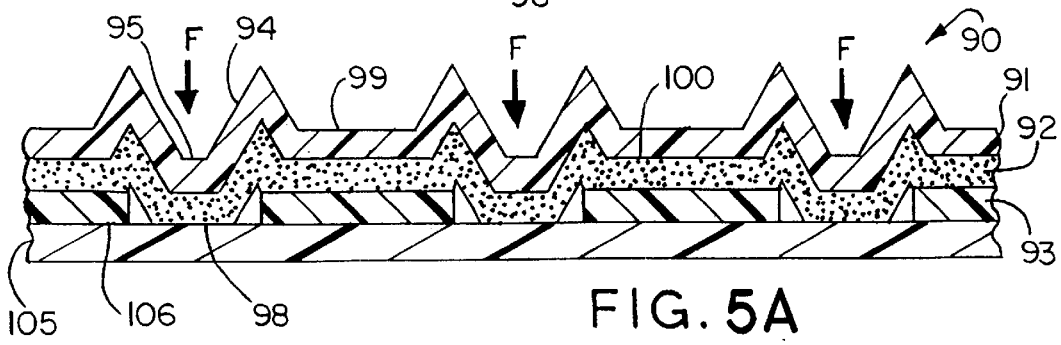
FIG. 5A is a cross-sectional side view of the three-dimensional adhesive film structure! of FIG. 5 on a target surface showing the effect of pressure.

FIG. 5A shows the three-dimensional adhesive film construction as described in FIG. 5 in contact with the upper surface 106 of a target 105 after the protrusions 94 have been partially deformed under pressure applied to the non-adhesive side of the film construction 90, as indicated by force "F". When the protrusions 94 are inverted as shown in FIG. 5A, the exposed adhesive surface 98 within the protrusion 94 is brought into contact with and adheres to the upper surface 106 of the target 105.

Figure 6:
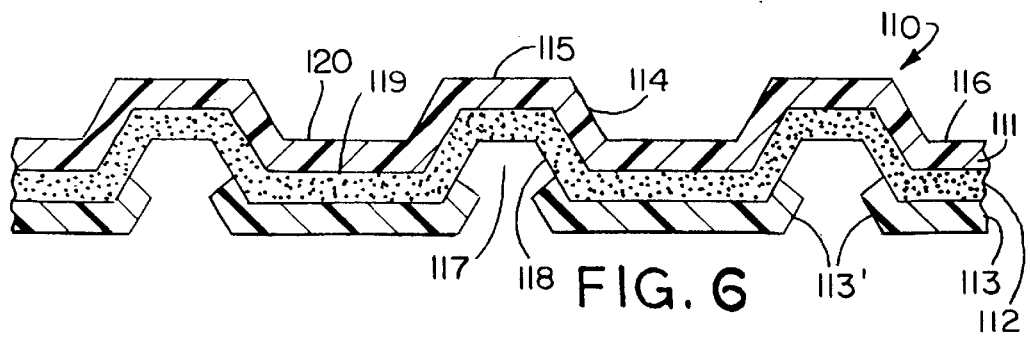
FIG. 6 is a cross-sectional side view of another three-dimensional adhesive film structure having a plurality of protrusions.

FIG. 6 illustrates another embodiment of the three-dimensional flexible adhesive film structures of the present invention. In this embodiment, the adhesive film structure 110 comprises polymer face film layer 111 having a front surface 116 and a back surface; an adhesive layer 112 having a front surface and a back surface wherein the front surface of the adhesive layer is in contact with and adhered to the back surface of the face film layer 111; and a discontinuous or patterned non-adhesive layer 113 having a front surface and a back surface wherein the front surface of the non-adhesive layer 113 is in contact with the back surface of a portion of the adhesive layer 112. The film construction 110 contains a plurality of spaced three-dimensional hollow protrusions 114 illustrated as being conical with a truncated or domed outermost end 115. The protrusions are separated from each other by valleys 120. The film construction 110 contains a plurality of hollow depressions 117 extending inwardly from the back surface of the adhesive layer 112, said depressions 117 corresponding to said hollow protrusions 114 extending outwardly from the face film 111. The patterned layer of adhesive 113 contains areas which are free of non-adhesive material, and as shown in FIG. 6, the areas of non-adhesive material in the non-adhesive layer 113 are within the depressions 117. In the embodiment illustrated in FIG. 6, the front surface of the discontinuous non-adhesive layer 113 is in contact with the portion of the adhesive layer 112 which is in contact with the back surface 119 of the face film in the valleys 117. Other portions 113 of the non-adhesive layer 113 extend into the depressions 117 and are adhered to portions of the lower surface of the adhesive 118 within the depressions 117. In each of the depressions 117, a portion of the lower surface 118 of the adhesive layer 112 within the depressions 117 is not coated with the non-adhesive material and retains its tacky character.

In one embodiment, the patterned or discontinuous layer of non-adhesive material is applied directly to the adhesive layer before the adhesive composite is formed into the desired three-dimensional structure. The patterned or discontinuous layer can be applied directly to the lower surface of the adhesive layer. In another embodiment, the patterned or discontinuous layer of a non-adhesive material is first applied to a liner, and the non-adhesive layer is thereafter then transferred from the liner to the adhesive layer of the adhesive composite by lamination.

Alternatively, the non-adhesive layer can be applied to the adhesive composites after the composite has been formed into a three-dimensional film structure! by techniques known to those skilled in the art. For example the three-dimensional structure can be formed by applying heat to portions of one side of the composite and a vacuum to the corresponding portions of the opposite side. Alternatively, the plurality of protrusions may be formed by applying heated compressed gas to the non-adhesive side of the composite while the composite rests on a forming screen. In yet another method, the adhesive composites may be formed by embossing. For example, the adhesive composite can be formed by embossing with a male embossing roll applied from the face film side of the composite or to the adhesive side. The adhesive side of the embossed shapes are then coated with a layer of non-adhesive material by contact, for example, with a rubber printing roll which contacts only the tips of the embossed shapes.

Any of the known embossing procedures can be utilized in preparing the three-dimensional flexible adhesive film constructions of the present invention. For example, the adhesive composites to be embossed can be fed to and between a male embossing roll and a female embossing roll or between a male roll and a soft rubber roll to create the desired embossed pattern. The adhesive composite can be embossed in the molten state upon leaving the coextruder, or the molten coextrudate can be cooled before embossing. Various patterns can be used, and these include patterns that provide shapes in the form of hexagons, diamonds, squares, wire mesh, domes, cones, ridges, etc. The number of shapes embossed into the composites may vary from about 10 to about 35 or 40 counts per inch and in one embodiment, the number varies from about 14 to about 30 counts per inch. The size of the valleys depends upon the shape and spacing of the shapes. In one embodiment wherein substantially only the adhesive contacting the lower surface of the face film in the valleys is covered with a non-adhesive material, the size of the valleys is selected to provide coverage by the non-adhesive material of from 40 to 80% of the total area of the adhesive layer. In other embodiments, the coverage may range from about 50 to 60%. In one particular embodiment, the valleys are hexagons at 20 per inch providing a coverage of non-adhesive material of from about 50 to about 60% of the total adhesive area.

In accordance with the present invention, a process for preparing a three-dimensional flexible adhesive film structure of the invention comprises (A) providing a molten coextrudate comprising:
(A-1) a continuous polymer face film having an front surface and a back surface, and
(A-2) an adhesive layer having a front surface and a back surface wherein the front surface of the adhesive layer is in contact with and adhered to the back surface of the polymer face film, (B) cooling the coextrudate,
(C) applying a patterned layer of a non-adhesive material having a front surface and a back surface to the back surface of the adhesive layer whereby the front surface of the patterned layer of non-adhesive material is in contact with and adhered to a portion of the back surface of the adhesive layer, said patterned layer containing areas free of non-adhesive material, thereby producing a composite of the face film, adhesive layer, and non-adhesive layer, and
(D) forming said composite to create a plurality of spaced hollow three-dimensional protrusions extending outwardly from the front surface of the polymer face film and separated from each other by valleys and a plurality of three-dimensional depressions in the opposite surface of the composite whereby the patterned layer of non-adhesive material is adhered to at least the back surface of the portion of the adhesive layer which is adhered to the back surfaces of the face film in the valleys, and the areas in the non-adhesive layer which are free of non-adhesive are within the depressions.

The molten coextrudate is provided in accordance with the procedure described earlier and illustrated in FIGS. 1 and 2. In the embodiments illustrated in FIGS. 1 and 2, and in the above examples 1 through 6, the molten coextrudate is deposited on a release liner when the molten coextrudate exits the die. The release liner can be removed when the adhesive composite is to be converted into the three-dimensional flexible adhesive film of this invention. In another embodiment, the molten coextrudate can be deposited on a casting roll at about room temperature to effect cooling of the coextrudate. Following cooling of the coextruclate, a patterned or discontinuous layer of a non-adhesive material is applied to the adhesive side of the coextrudate, and the patterned or discontinuous layer contains areas which are free of non-adhesive material thereby producing a composite of the face film, adhesive layer, and non-adhesive layer containing areas free of non-adhesive material. The composite is then formed by techniques known to those skilled in the art to create a plurality of spaced hollow three-dimensional protrusions extending outwardly from the front surface of the polymer face film, and the protrusions are separated from each other by valleys. A plurality of three-dimensional depressions are formed extending inwardly in the opposite surface (adhesive side) of the composite and corresponding to the hollow protrusions extending outwardly from the front surface of the polymer face film. After formation, the patterned or discontinuous layer of non-adhesive material is adhered to at least the back surface of the portion of the adhesive layer which is adhered to the back surfaces of the face film which is in the valleys, and the areas of the non-adhesive layer which are free of non-adhesive are within the depressions so that at least a portion of the lower surface of the adhesive layer which is within the depressions is not covered with the non-adhesive material and remains tacky. In this embodiment, a portion of the non-adhesive material of the adhesive layer may adhere to and partially fill the depressions in the back surface of the adhesive layer although it is essential that at least a portion of the lower surface of the adhesive layer within the depression is free of the non-adhesive material and remains tacky.

In another embodiment, the three-dimensional flexible adhesive film structures of the present invention may be prepared by a process which comprises:
(A) providing a molten coextrudate comprising:
(A-1) a continuous polymer face film having an front surface and a back surface, and (A-2) an adhesive layer having a front surface and a back surface wherein the front surface of the adhesive layer is in contact with and adhered to the back surface of the polymer face film, (B) cooling the molten coextrudate, (C) forming said coextrudate to create a plurality of spaced hollow three-dimensional protrusions extending outwardly from the front surface of the polymer face film and a plurality of three-dimensional depressions in the back surface of the adhesive layer corresponding to the plurality of hollow protrusions on the front surface of the face film, wherein the protrusions on the face film are separated from each other by valleys, (D) applying a patterned layer of non-adhesive material to the back surface of the portion of the adhesive layer which adhered to the back surfaces of the face film in the valleys.

In the above process, the molten coextrudate can be provided in a manner illustrated in FIGS. 1 and 2, and the molten coextrudate can be cooled by depositing the molten coextrudate on a release liner or on a casting roll as described above. If cooled on a release liner, the coextrudate is then removed from the release liner and formed by any of the techniques described above to create a plurality of spaced hollow three-dimensional protrusions extending outwardly from the front surface of the polymer face film of the coextrudate, and a plurality of three-dimensional depressions in the back surface of the adhesive layer corresponding to the plurality of hollow protrusions on the front surface of the face film. The protrusions on the face film are separated from each other by valleys. After the coextrudate has been formed as described, a patterned or discontinuous layer of a non-adhesive material is applied to the back surface of the portion of the adhesive layer which is adhered to the back surfaces of the face film in the valleys. The application of the patterned or discontinuous layer of non-adhesive material to the back surface of the indicated portion of the adhesive layer can be accomplished using a rubber printing roll which contacts only the indicated portion of the adhesive layer. Following application of the non-adhesive layer, the three-dimensional structure may be dried, trimmed and wound in roll form for storage and subsequent use.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A three dimensional flexible film structure comprising:
   (A) a flexible polymer face film having a front surface and a back surface,
   (B) an adhesive layer having a front surface and a back surface wherein the front surface of the adhesive layer is in contact with and adhered to the back surface of the flexible polymer face film, and
   (C) a patterned layer of a non-adhesive material having a front surface and a back surface and containing one or more areas free of non-adhesive material wherein the front surface of the layer of non-adhesive material is in contact with and adhered to the back surface of the adhesive layer, and wherein the structure comprises at least one area having one or more, three-dimensional hollow protrusions extending outwardly from the front surface of the face film, and at least one area having one or more three-dimensional depressions extending inwardly from the back surface of the adhesive layer, said depressions corresponding to said one or more hollow protrusions on the front surface of the face film, and the area or areas in the non-adhesive layer which are free of non-adhesive material are within the three-dimensional depression or depressions in the back surface of the adhesive layer.

2. The film structure of claim 1 wherein the non-adhesive material adheres to and partially fills said depressions.

3. The flexible film of claim 1 wherein the hollow protrusions are deformable by compression force applied substantially perpendicular to a plane defined by the three-dimensional flexible film structure, and wherein said hollow protrusions deform in a direction substantially perpendicular to said plane.

4. The film structure of claim 1 wherein the polymer face film (A) is a multilayer film.

5. The film structure of claim 1 wherein the adhesive layer comprises a pressure sensitive adhesive.

6. The film structure of claim 1 wherein the polymer face film comprises a film selected from polystyrenes, polyolefins, polyamides, polyesters, polycarbonates, polyurethanes, polyacrylates, polyvinyl alcohol, poly (ethylene vinyl alcohol), poly(alkylene vinyl acetates), poly (alkylene acrylates), ionomers, and mixtures thereof.

7. The film structure of claim 1 wherein the polymeric face film (A) comprises a polyolefin.

8. The film structure of claim 1 wherein the polymeric face film (A) comprises a propylene polymer or copolymer.

9. The film structure of claim 1 wherein the adhesive layer comprises an adhesive composition comprising a thermoplastic elastomeric component and a solid tackifier resin component.

10. The film structure of claim 9 wherein the adhesive composition also comprises at least one liquid rubber component.

11. The film structure of claim 1 wherein the adhesive layer comprises a pressure sensitive adhesive composition which comprises from about 40 to about 80% by weight of a thermoplastic elastomer component and from about 20 to about 60% by weight of a solid tackifier resin component.

12. A three dimensional flexible film structure comprising:
   (A) a flexible polymer face film having a front surface and a back surface,
   (B) an adhesive layer having a front surface and a back surface wherein the front surface of the adhesive layer is in contact with and adhered to the back surface of the flexible polymer face film, and
   (C) a patterned layer of a non-adhesive material having a front surface and a back surface and containing one or more areas free of non-adhesive material wherein the front surface of the layer of non-adhesive material is in contact with and adhered to the back surface of the adhesive layer, and wherein the structure comprises at least one area having a plurality of spaced three-dimensional hollow protrusions extending outwardly from the front surface of the face film, and at least one area having a plurality of spaced three-dimensional depressions extending inwardly from the back surface of the adhesive layer, said depressions corresponding to said plurality of hollow protrusions on the front surface of the face film, and the areas in the non-adhesive layer which are free of non-adhesive material are within the three-dimensional depressions in the back surface of the adhesive layer.

13. The film structure of claim 12 wherein the non-adhesive material is adhered to and partially fills the depressions in the back surface of the face film.

14. The film structure of claim 12 wherein said hollow protrusions are deformable by a compression force applied substantially perpendicular to a plane defined by said three-dimensional flexible film structure and wherein said hollow protrusions deform in a direction substantially perpendicular to said plane.

15. The construction of claim 12 wherein the polymer face film comprises a film selected from polystyrenes, polyolefins, polyamides, polyesters, polycarbonates, polyurethanes, polyacrylates, polyvinyl alcohol, poly(ethylene vinyl alcohol), poly(alkylene vinyl acetates), poly(alkylene acrylates), ionomers, and mixtures thereof.

16. The construction of claim 12 wherein the polymer face film (A) comprises a polyolefin.

17. The construction of claim 12 wherein the polymer face film (A) comprises a propylene polymer or copolymer.

18. The construction of claim 12 wherein the polymeric film contains at least one nucleating agent.

19. The construction of claim 12 wherein the adhesive layer comprises a pressure sensitive adhesive.

20. The construction of claim 12 wherein the adhesive layer (B) has a coat weight in the range of from about 0.5 to about 20 $g/m^2$.

21. The construction of claim 12 wherein the protrusions are in the shape of hexagons, diamonds or squares.

22. A three dimensional flexible film structure comprising:
(A) a flexible polymer face film having a front surface and a back surface,
(B) an adhesive layer having a front surface and a back surface wherein the front surface of the adhesive layer is in contact with and adhered to the back surface of the flexible polymer face film, and
(C) a patterned layer of a non-adhesive material having a front surface and a back surface wherein the front surface of the layer of non-adhesive material is in contact with and adhered to the back surface of a portion of the adhesive layer, and wherein the structure comprises at least one area having a plurality of spaced three-dimensional hollow protrusions extending outwardly from the front surface of the face film and separated from each other by valleys, and at least one area having a plurality of spaced three-dimensional depressions extending inwardly from the back surface of the adhesive layer, said depressions corresponding to said plurality of spaced hollow protrusions on the front surface of the face film, and the front surface of the non-adhesive layer in contact with a portion of the back surface of the adhesive layer is in contact with and adhered to at least the portion of the adhesive adhered to the back surface of the face film in the valleys, provided that at least a portion of the back surface of the adhesive layer within the depressions is free of the non-adhesive material.

23. The film structure of claim 22 wherein the front surface of the patterned layer of non-adhesive material is in contact with and adhered to the back surface of the portion of the adhesive layer which is adhered to the back surface of the face film in the valleys.

24. The film structure of claim 22 wherein the front surface of the patterned layer of non-adhesive material is in contact with and adhered to the portion of the back surface of the adhesive layer which is adhered to the back surface of the face film in the valleys and to a portion of the adhesive layer within the depressions in the back surface of the polymer face film.

25. The film structure of claim 22 wherein the flexible polymer face film (A) comprise a multilayer film.

26. The film structure of claim 22 wherein the adhesive layer comprises a pressure sensitive adhesive.

27. The film structure of claim 22 wherein the non-adhesive material adheres to and partially fills said depressions.

28. The flexible film of claim 22 wherein the hollow protrusions are deformable by compression force applied substantially perpendicular to a plane defined by the three-dimensional flexible film structure, and wherein said hollow protrusions deform in a direction substantially perpendicular to said plane.

29. The construction of claim 22 wherein the polymer film comprises a film selected from polystyrenes, polyolefins, polyamides, polyesters, polycarbonates, polyurethanes, polyacrylates, polyvinyl alcohol, poly(ethylene vinyl alcohol), poly(alkylene vinyl acetates), poly(alkylene acrylates), ionomers, and mixtures thereof.

30. The film structure of claim 22 wherein the polymeric film (A) comprises a polyolefin.

31. The film structure of claim 22 wherein the polymeric film (A) comprises a propylene polymer or copolymer.

32. The film structure of claim 22 wherein the adhesive layer comprises an adhesive composition comprising a thermoplastic elastomeric component and a solid tackifier resin component.

33. The film structure of claim 32 wherein the adhesive composition also comprises at least one liquid rubber component.

34. The film structure of claim 22 wherein the adhesive layer comprises a pressure sensitive adhesive composition which comprises from about 40 to about 80% by weight of a thermoplastic elastomer component and from about 20 to about 60% by weight of a solid tackifier resin component.

35. A three-dimensional flexible film structure comprising:
(A) a coextrudate comprising:
(A-1) a flexible polymer face film having a front surface and a back surface, and
(A-2) an adhesive layer having a front surface and a back surface wherein the front surface of the adhesive layer is in contact with and adhered to the back surface of the flexible polymer face film,
(B) a patterned layer of a non-adhesive material having a front surface and a back surface and containing a plurality of areas which are free of non-adhesive material, wherein the structure comprises at least one area having a plurality of spaced three-dimensional hollow protrusions extending outwardly from the front surface of the face film and separated from each other by valleys, and at least one area having a plurality of spaced three-dimensional depressions extending inwardly from the back surface of the adhesive layer, said depressions corresponding to said plurality of hollow protrusions, and the front surface of the patterned non-adhesive material is in contact with and adhered to at least the back surface of the portion of the adhesive layer which is adhered to the back surfaces of the face film in the valleys, and the areas in the non-adhesive layer which are free of non-adhesive material are within the depressions.

36. The film structure of claim 35 wherein the polymeric film (A) is a multilayer film.

37. The film structure of claim 35 wherein the polymer face film is selected from polystyrenes, polyolefins, polyamides, polyesters, polycarbonates, polyurethanes, polyacrylates, polyvinyl alcohol, poly(ethylene vinyl alcohol), poly(alkylene vinyl acetates), poly(alkylene acrylates), ionomers, and mixtures thereof.

38. The film structure of claim 36 wherein the polymer face film (A) comprises a polyolefin.

39. The film structure of claim 36 wherein the polymer face film (A) comprises a propylene polymer or copolymer.

40. The film structure of claim 36 wherein the polymer face film contains at least one nucleating agent.

41. The film structure of claim 36 wherein the adhesive layer comprises a pressure sensitive adhesive.

42. The film structure of claim 41 wherein the adhesive layer (B) has a coat weight in the range of from about 0.5 to about 20 g/m$^2$.

43. The film structure of claim 36 wherein the polymeric face film has a hot melt viscosity that is within a factor of from about 0.07 to about 20 times the hot melt viscosity of the adhesive at the shear rates incurred during the coextrusion process.

44. The film structure of claim 36 wherein the coextrudate has not been monoaxially or biaxially oriented.

45. The film structure of claim 36 wherein the coextrudate has been oriented in the machine direction.

46. The film structure of claim 36 wherein the adhesive layer comprises an adhesive composition comprising a thermoplastic elastomeric component and a solid tackifier resin component.

47. The film structure of claim 46 wherein the adhesive composition also comprises at least one liquid rubber component.

48. The film structure of claim 36 wherein the adhesive layer comprises a pressure sensitive adhesive composition which comprises from about 40 to about 80% by weight of a thermoplastic elastomer component and from about 20 to about 60% by weight of a solid tackifier resin component.

49. The film structure of claim 48 wherein the thermoplastic elastomeric component comprises at least one thermoplastic elastomeric block copolymer.

50. The film structure of claim 49 wherein the thermoplastic elastomeric block copolymer is selected from the group consisting of linear, branched, grafted or radial copolymers.

51. The film structure of claim 48 wherein the thermoplastic elastomeric component of the adhesive has a melt index of less than about 10.

52. The film structure of claim 36 wherein the polymer face film has a hot melt viscosity that is within a factor of from about 0.07 to about 20 times the hot melt viscosity of the adhesive at the shear rates incurred during the coextrusion process.

53. A process of preparing a three-dimensional flexible film structure which comprises:
   (A) providing a molten coextrudate comprising:
       (A-1) a continuous polymer face film having an front surface and a back surface, and
       (A-2) an adhesive layer having a front surface and a back surface wherein the front surface of the adhesive layer is in contact with and adhered to the back surface of the polymer face film,
   (B) cooling the coextrudate,
   (C) applying a patterned layer of a non-adhesive material having a front surface and a back surface to the back surface of the adhesive layer whereby the front surface of the patterned layer of non-adhesive material is in contact with and adhered to a portion of the back surface of the adhesive layer, said patterned layer containing areas free of non-adhesive material, thereby producing a composite of the face film, adhesive layer, and non-adhesive layer, and
   (D) forming said composite to create a plurality of spaced hollow three-dimensional protrusions extending outwardly from the front surface of the polymer face film and separated from each other by valleys and a plurality of three-dimensional depressions in the opposite surface of the composite whereby the patterned layer of non-adhesive material is adhered to at least the back surface of the portion of the adhesive layer which is adhered to the back surfaces of the face film in the valleys, and the areas in the non-adhesive layer which are free of non-adhesive are within the depressions.

54. The process of claim 53 wherein the molten coextrudate is formed in a multilayer vane die, and the molten coextrudate exiting the die is self supporting until it is deposited on a casting roll.

55. The process of claim 53 wherein the molten coextrudate is formed in a multimanifold die having a common land length of from 0 to about 10 mm.

56. The process of claim 53 wherein the thickness of the polymeric film (A-1) is from about 0.2 to about 1 mil.

57. The process of claim 53 wherein the polymer face film (A-1) is a multilayer film.

58. The process of claim 53 wherein the polymer face film (A-1) is selected from polystyrenes, polyolefins, polyamides, polyesters, polycarbonates, polyurethanes, polyacrylates, poly(alkylene vinyl acetates), poly(alkylene acrylates), ionomers, and mixtures thereof.

59. The process of claim 53 wherein the polymer face film (A-1) comprises a polyolefin.

60. The process of claim 53 wherein the adhesive layer comprises a pressure sensitive adhesive.

61. The process of claim 53 wherein the adhesive layer (A-2) has a coat weight in the range of from about 0.5 to about 20 g/m$^2$.

62. The process of claim 53 wherein the polymer face film (A-1) has a hot melt viscosity that is within a factor of from about 1 to about 20 times the hot melt viscosity of the adhesive.

63. The process of claim 53 wherein the adhesive layer comprises an adhesive composition comprising a thermoplastic elastomeric component and a solid tackifier resin component.

64. The process of claim 63 wherein the adhesive composition also comprises at least one liquid rubber component.

65. The process of claim 53 wherein the adhesive layer comprises a pressure sensitive adhesive composition which comprises from about 40 to about 80% by weight of a thermoplastic elastomer component and from about 20 to about 60% by weight of a solid tackifier resin component.

66. The process of claim 63 wherein the thermoplastic elastomeric component comprises at least one thermoplastic elastomeric block copolymer.

67. The process of claim 53 wherein the melt index of the polymer face film material of the film (A-1) is less than about 10.

68. A process of preparing a three-dimensional flexible film structure which comprises:
   (A) providing a molten coextrudate comprising:
       (A-1) a continuous polymer face film having an front surface and a back surface, and
       (A-2) an adhesive layer having a front surface and a back surface wherein the front surface of the adhesive layer is in contact with and adhered to the back surface of the polymer face film, (B) cooling the molten coextrudate, (C) forming said coextrudate to create a plurality of spaced hollow three-dimensional protrusions extending outwardly from the front surface of the polymer face film and a plurality of three-dimensional depressions in the back surface of the adhesive layer corresponding to the plurality of hollow protrusions on the front surface of the face film, wherein the protrusions on the face film are separated from each other by valleys, and (D) applying a patterned layer of non-adhesive material to the back surface of the portion of the adhesive layer which adhered to the back surfaces of the face film in the valleys.

69. The process of claim 68 wherein the molten coextrudate is formed in a multilayer vane die, and the molten coextrudate exiting the die is self supporting until it is deposited on a casting roll.

70. The process of claim 68 wherein the molten coextrudate is formed on a multimanifold die having a common land length of from 0 to about 10mm.

71. The process of claim 68 wherein the thickness of the polymeric film (A-1) is from about 0.2 to about 1 mil.

72. The process of claim 68 wherein the polymer face film (A-1) is a multilayer film.

73. The process of claim 68 wherein the polymer face film (A-1) is selected from polystyrenes, polyolefins, polyamides, polyesters, polycarbonates, polyurethanes, polyacrylates, poly(alkylene vinyl acetates), poly(alkylene acrylates), ionomers, and mixtures thereof.

74. The process of claim 68 wherein the polymer face film (A-1) comprises a polyolefin.

75. The process of claim 68 wherein the adhesive layer comprises a pressure sensitive adhesive.

76. The process of claim 68 wherein the adhesive layer (A-2) has a coat weight in the range of from about 0.5 to about 20 $g/m^2$.

77. The process of claim 68 wherein the polymer face film (A-1) has a hot melt viscosity that is within a factor of from about 1 to about 20 times the hot melt viscosity of the adhesive.

78. The process of claim 68 wherein the adhesive layer comprises an adhesive composition comprising a thermoplastic elastomeric component and a solid tackifier resin component.

79. The process of claim 78 wherein adhesive composition also comprises at least one liquid rubber component.

80. The process of claim 68 wherein the adhesive layer comprises a pressure sensitive adhesive composition which comprises from about 40 to about 80% by weight of a thermoplastic elastomer component and from about 20 to about 60by weight of a solid tackifier resin component.

81. The process of claim 78 wherein the thermoplastic elastomeric component comprises at least one thermoplastic elastomeric block copolymer.

82. The process of claim 68 wherein the melt index of the polymer face film material of the film (A-1) is less than about 10.

* * * * *